US012795732B2

(12) United States Patent
Lee et al.

(10) Patent No.: US 12,795,732 B2
(45) Date of Patent: Nov. 10, 2026

(54) METHOD FOR TRANSMITTING AND RECEIVING SIGNAL IN WIRELESS COMMUNICATION SYSTEM

(71) Applicant: LG ELECTRONICS INC., Seoul (KR)

(72) Inventors: Sangrim Lee, Seoul (KR); Hojae Lee, Seoul (KR); Yeongjun Kim, Seoul (KR); Kijun Jeon, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 684 days.

(21) Appl. No.: 18/030,800

(22) PCT Filed: Oct. 15, 2020

(86) PCT No.: PCT/KR2020/014104
§ 371 (c)(1),
(2) Date: Apr. 7, 2023

(87) PCT Pub. No.: WO2022/080532
PCT Pub. Date: Apr. 21, 2022

(65) Prior Publication Data
US 2023/0422308 A1 Dec. 28, 2023

(51) Int. Cl.
*H04W 74/0833* (2024.01)
*G06N 3/098* (2023.01)

(52) U.S. Cl.
CPC ........ *H04W 74/0833* (2013.01); *G06N 3/098* (2023.01)

(58) Field of Classification Search
CPC .............. H04W 28/20; H04W 28/0236; H04L 12/4641; H04L 47/765
See application file for complete search history.

(56) References Cited

U.S. PATENT DOCUMENTS

2018/0367238 A1* 12/2018 Gong ...................... H04J 99/00
2019/0138934 A1 5/2019 Prakash et al.
2020/0151798 A1* 5/2020 Sim ........................ G06N 3/098

FOREIGN PATENT DOCUMENTS

WO 2020147965 A1 7/2020

OTHER PUBLICATIONS

"Physical-Layer Arithmetic for Federated Learning in Uplink MU-MIMO Enabled Wireless Networks", IEEE INFOCOM 2020, Aug. 4, 2020, pp. 1221-1230 (Year: 2020).*

(Continued)

*Primary Examiner* — Wei Zhao
*Assistant Examiner* — Nhu Pham
(74) *Attorney, Agent, or Firm* — BRYAN CAVE LEIGHTON PAISNER LLP

(57) ABSTRACT

A superposition-based method for transmitting and receiving signals in wireless communication is provided. Provided is a signal reception method performed by a base station which performs federated machine-learning in a wireless communication system, the signal reception method comprising the steps of: receiving an aggregated signal; demodulating the aggregated signal; and decoding the aggregated signal, wherein the decoding is performed on the basis of a codebook combining the respective codebooks of a plurality of terminals, the aggregated signal is obtained by superposition, on a wireless channel, of signals respectively transmitted from the plurality of terminals, and the respective signals include information about neural network parameters related to the federated machine-learning respectively performed by the plurality of terminals.

6 Claims, 39 Drawing Sheets

(56) References Cited

OTHER PUBLICATIONS

Huang et al. ("Physical-Layer Arithmetic for Federated Learning in Uplink MU-MIMO Enabled Wireless Networks", IEEE INFOCOM 2020, Aug. 4, 2020, pp. 1221-1230; hereinafter "Huang") (Year: 2020).*
Huang et al. ("Physical-Layer Arithmetic for Federated Learning in Uplink MU-MIMO Enabled Wireless Networks", IEEE Infocom 2020, Aug. 4, 2020, pp. 1221-1230 (Year: 2020).*
J. Shi et al., "Signal Recognition Based On Federated Learning", IEEE INFOCOM 2020—IEEE Conference on Computer Communications Workshops (INFOCOM Wkshps), Aug. 10, 2020, pp. 1105-1110.
L. Yu et al., "An Optimized Design of SCMA Codebook Based on Star-QAM Signaling Constellations", 2015 International Conference on Wireless Communications & Signal Processing (WCSP), Dec. 3, 2015.
T. Huang et al., "Physical-Layer Arithmetic for Federated Learning in Uplink MU-MIMO Enabled Wireless Networks", IEEE INFOCOM 2020—IEEE Conference on Computer Communications, Aug. 4, 2020, pp. 1221-1230.

* cited by examiner (control plane)

(user plane)

FIG. 27

$$w_1 = [\overbrace{0,\ 1,\ 5,\ 3,\ 1,\ 6,\ \ldots,\ 3}^{k\text{ - length}}]$$

$$c(w_1) = \overbrace{[1, 1, 4, 2, 5, 4, \ldots, 5]}^{k\text{ - length}}$$

FIG. 31

$$y = x_1 + x_2 + N_{noise}$$

$$\Rightarrow \begin{array}{l} y_I = [\,-4.2,\ -6.2,\ 0,\ 4.14,\ 2.2,\ \ldots,\ 6.12\,] \\ y_Q = [\,4.3,\ 2.01,\ 4.2,\ 4.1,\ 2.21,\ \ldots,\ 4.22\,] \end{array} \Rightarrow z = [\,y_{1,i},\ y_{1,Q},\ \ldots,\ y_{m,I},\ y_{m,Q}\,]$$

METHOD FOR TRANSMITTING AND RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2020/014104, filed on Oct. 15, 2020.

TECHNICAL FIELD

The present disclosure relates to wireless communications.

BACKGROUND

Recent attempts to integrate AI with wireless communication systems have been focused on the application layer, network layer, and in particular, deep learning in wireless resource management and allocation. However, this research is increasingly advancing to the MAC layer and physical layer, with attempts to combine deep learning with wireless transmission, especially at the physical layer. AI-driven physical layer transmission means that the underlying signal processing and communication mechanisms are based on AI drivers rather than traditional communication frameworks. For example, it may include deep learning-based channel coding and decoding, deep learning-based signal estimation and detection, deep learning-based Multiple Input Multiple Output (MIMO) mechanisms, AI-based resource scheduling and allocation, etc.

Federated learning is one of the techniques of distributed machine learning, in which multiple devices that are the subject of learning share parameters such as weight and gradient of the local model with the server, and the server updates the global parameter by aggregating the local model parameters of each device. In this process, the raw data of each device is not shared, which reduces the communication overhead in the data transmission process and protects privacy.

SUMMARY

The present disclosure proposes a superposition-based signal transmission and reception method in a wireless communication system.

According to the present disclosure, reliable transmission and reception of signals is possible while saving resources based on superposition characteristics.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 27 illustrates an example of input data in a signal generation method of a transmitting device.

FIG. 31 illustrates an example of data acquisition by a receiving device.

DETAILED DESCRIPTION

Figure 1:
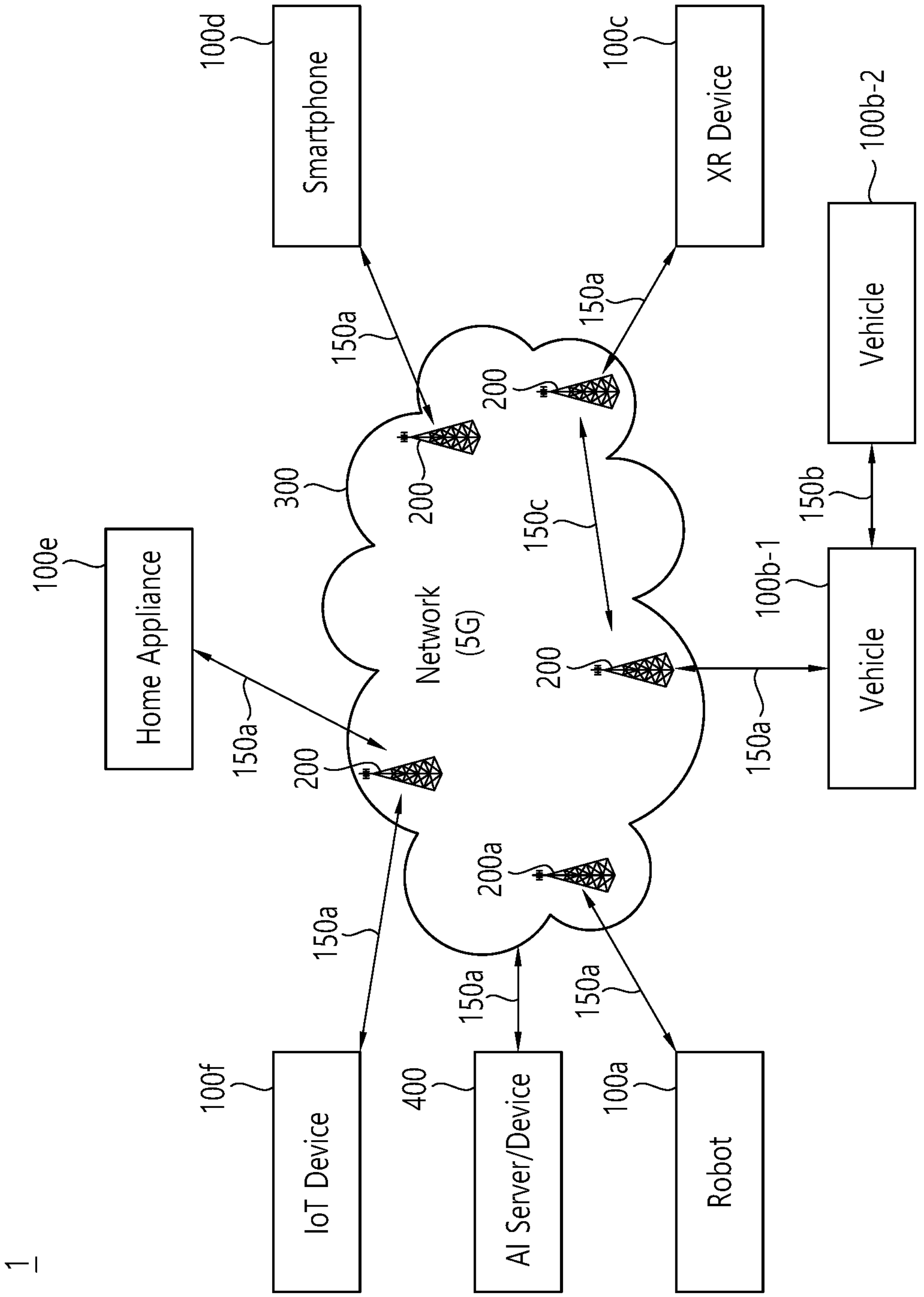
FIG. 1 is a diagram illustrating an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the present disclosure, when a certain portion "includes" or "comprises" a certain component, this indicates that other components are not excluded and may be further included unless otherwise noted. The terms "unit", "-or/er" and "module" described in the present disclosure indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the present disclosure or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an Uplink (UL). Likewise, the mobile station may serve as a receiver and the BS may serve as a transmitter, on a Downlink (DL).

The embodiments of the present disclosure may be supported by standard specifications disclosed for at least one of wireless access systems including an Institute of Electrical and Electronics Engineers (IEEE) 802.xx system, a 3$^{rd}$ Generation Partnership Project (3GPP) system, a 3GPP Long Term Evolution (LTE) system, 3GPP 5$^{th}$ Generation (5G) New Radio (NR) system, and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc., used in the present disclosure, refer to matters described in the standard documents published prior to the present disclosure. For example, reference may be made to the standard documents 36.xxx and 38.xxx.

Hereinafter, a communication system applicable to the present disclosure is described.

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a diagram illustrating an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an Artificial Intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an Unmanned Aerial Vehicle (UAV) (e.g., a drone). The XR device 100*c* may include an Augmented Reality (AR)/Virtual Reality (VR)/Mixed Reality (MR) device and may be implemented in the form of a Head-Mounted Device (HMD), a Head-Up Display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology may be applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication (or D2D communication) 150*b* or communication 150*c* between base stations (e.g., relay, Integrated Access Backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes, various signal processing procedures (e.g., channel encoding/decoding, modulation/demodulation, resource mapping/demapping, etc.), resource allocation processes, etc., for transmission/reception of radio signals may be performed.

Figure 2:
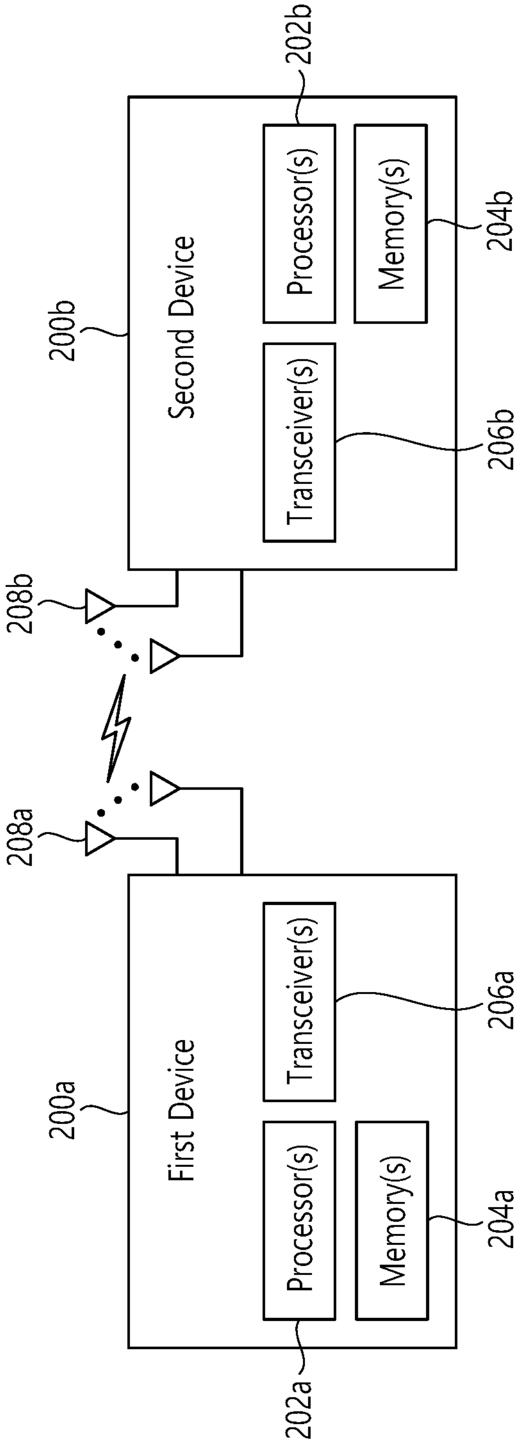
FIG. 2 is a diagram illustrating an example of a wireless device applicable to the present disclosure.

FIG. 2 is a diagram illustrating an example of a wireless device applicable to the present disclosure.

Referring to FIG. 2, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be connected with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be connected with the processor 202*a* to transmit and/or receive radio signals through one or more antennas 208*a*. The transceiver 206*a* may include a transmitter and/or a receiver. The transceiver 206*a* may be used interchangeably with a Radio Frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be connected with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be connected with the processor 202*b* to transmit and/or receive radio signals through one or more antennas 208*b*. The transceiver 206*b* may include a transmitter and/or a receiver. The transceiver 206*b* may be used interchangeably with a RF unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as physical (PHY), Media Access Control (MAC), Radio Link Control (RLC), Packet Data Convergence protocol (PDCP), Radio Resource Control (RRC), Service Data Adaptation Protocol (SDAP)). One or more processors 202*a* and 202*b* may generate one or more Protocol Data Units (PDUs) and/or one or more Service Data Units (SDUs) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more Application Specific Integrated Circuits (ASICs), one or more Digital Signal Processors (DSPs), one or more Digital Signal Processing Devices (DSPDs), Programmable Logic Devices (PLDs) or one or more Field Programmable Gate Arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be connected with one or more processors 202*a* and 202*b* to store various types of data, signals, messages, information, programs, code, instructions and/or commands. One or more memories 204*a* and 204*b* may be composed of Read-Only Memories (ROMs), Random Access Memories (RAMs), Erasable Programmable Read-Only Memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be connected with one or more processors 202*a* and 202*b* through various technologies such as wired or wireless connection.

One or more transceivers 206*a* and 206*b* may transmit user data, control information, radio signals/channels, etc., described in the methods and/or operational flowcharts of the present disclosure to one or more other devices. One or more transceivers 206*a* and 206*b* may receive user data, control information, radio signals/channels, etc., described in the methods and/or operational flowcharts of the present disclosure from one or more other devices. For example, one or more transceivers 206*a* and 206*b* may be connected with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other devices. In addition, one or more processors 202*a* and 202*b* may perform control such that one or more transceivers 206*a* and 206*b* receive user data, control information or radio signals from one or more other devices. In addition, one or more transceivers 206*a* and 206*b* may be connected with one or more antennas 208*a* and 208*b*, and one or more transceivers 206*a* and 206*b* may be configured to transmit/receive user data, control information, radio signals/channels, etc., described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc., from RF band signals to baseband signals, in order to process the received user data, control information, radio signals/channels, etc., using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Hereinafter, a wireless device structure applicable to the present disclosure is described.

Figure 3:
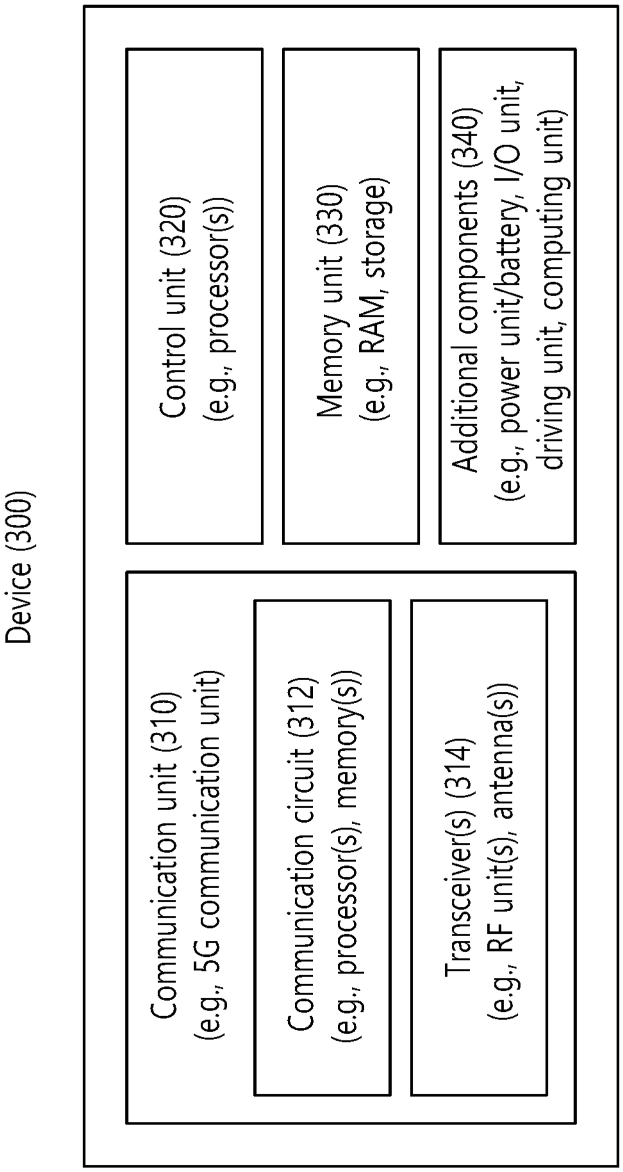
FIG. 3 is a diagram illustrating another example of a wireless device applicable to the present disclosure.

FIG. 3 is a diagram illustrating another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically connected with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIGS. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 1000, a digital broadcast terminal, a hologram device, a public safety device, an MTC device, a medical device, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be connected with each other through wired interfaces or at least some thereof may be wirelessly connected through the communication unit 310. For example, in the wireless device 300, the control unit 320 and the communication unit 310 may be connected by wire, and the control unit 320 and the first unit (e.g., 130 or 140) may be wirelessly connected through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an Application Processor, an Electronic Control Unit (ECU), a graphic processing processor, a memory control processor, etc. In another example, the memory unit 330 may be composed of a RAM, a Dynamic RAM (DRAM), a ROM, a flash memory, a volatile memory, a non-volatile memory and/or a combination thereof.

Hereinafter, a hand-held device applicable to the present disclosure is described.

Figure 4:
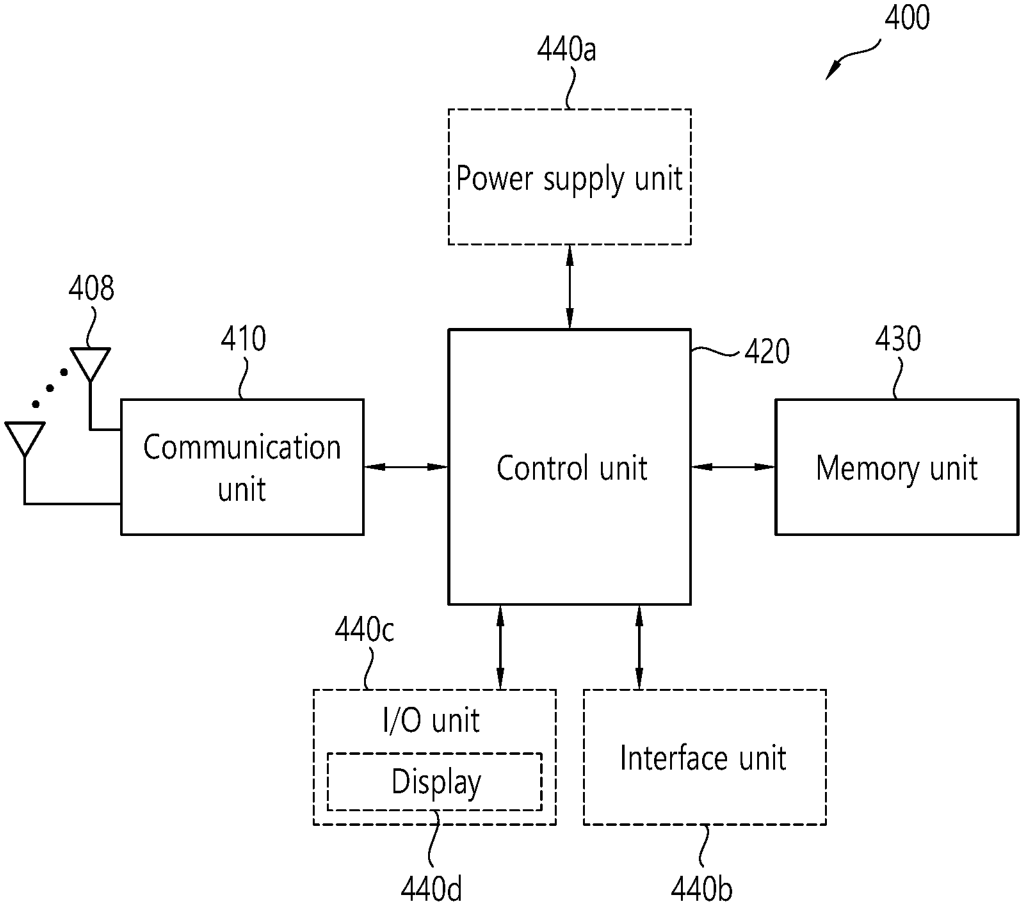
FIG. 4 is a diagram illustrating an example of a hand-held device applicable to the present disclosure.

FIG. 4 is a diagram illustrating an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a Mobile Station (MS), a User Terminal (UT), a Mobile Subscriber Station (MSS), a Subscriber Station (SS), an Advanced Mobile Station (AMS) or a Wireless Terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an Application Processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory unit 430 into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Hereinafter, types of wireless devices applicable to the present disclosure are described.

Figure 5:
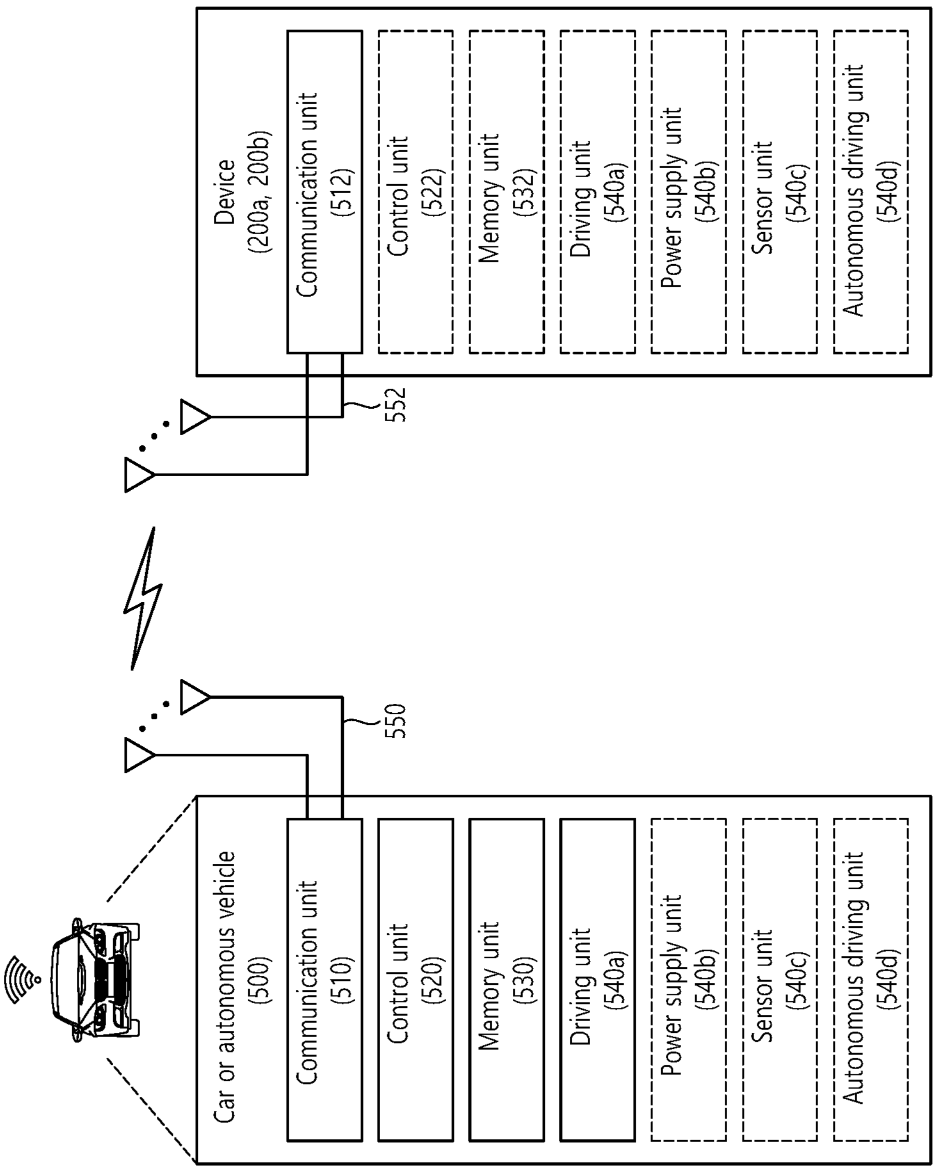
FIG. 5 is a diagram illustrating an example of a car or an autonomous driving vehicle applicable to the present disclosure.

FIG. 5 is a diagram illustrating an example of a car or an autonomous driving vehicle applicable to the present disclosure.

FIG. 5 shows a car or an autonomous driving vehicle applicable to the present disclosure. The car or the autonomous driving vehicle may be implemented as a mobile robot, a vehicle, a train, a manned/unmanned Aerial Vehicle (AV), a ship, etc., and the type of the car is not limited.

Referring to FIG. 5, the car or autonomous driving vehicle 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving vehicle 500 to perform various operations. The control unit 520 may include an Electronic Control Unit (ECU). The driving unit 540*a* may drive the car or autonomous driving vehicle 500 on the ground. The driving unit 540*a* may include an engine, a motor, a power train, wheels, a brake, a steering device, etc. The power supply unit 540*b* may supply power to the car or autonomous driving vehicle 500, and include a wired/wireless charging circuit, a battery, etc. The sensor unit 540*c* may obtain a vehicle state, surrounding environment information, user information, etc. The sensor unit 540*c* may include an Inertial Navigation Unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving unit 540*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc., from an external server. The autonomous driving unit 540*d* may generate an autonomous driving route and a driving plan based on the acquired data. The control unit 520 may control the driving unit 540*a* (e.g., speed/direction control) such that the car or autonomous driving vehicle 500 moves along the autonomous driving route according to the driving plane. During autonomous driving, the communication unit 510 may aperiodically/periodically acquire latest traffic information data from an external server and acquire surrounding traffic information data from neighboring cars. In addition, during autonomous driving, the sensor unit 540*c* may acquire a vehicle state and surrounding environment information. The autonomous driving unit 540*d* may update the autonomous driving route and the driving plan based on newly acquired data/information. The communication unit 510 may transmit information such as a vehicle location, an autonomous driving route, a driving plan, etc., to the external server. The external server may predict traffic information data using AI technology or the like based on the information collected from the cars or autonomous driving vehicles and provide the predicted traffic information data to the cars or autonomous driving vehicles.

Figure 6:
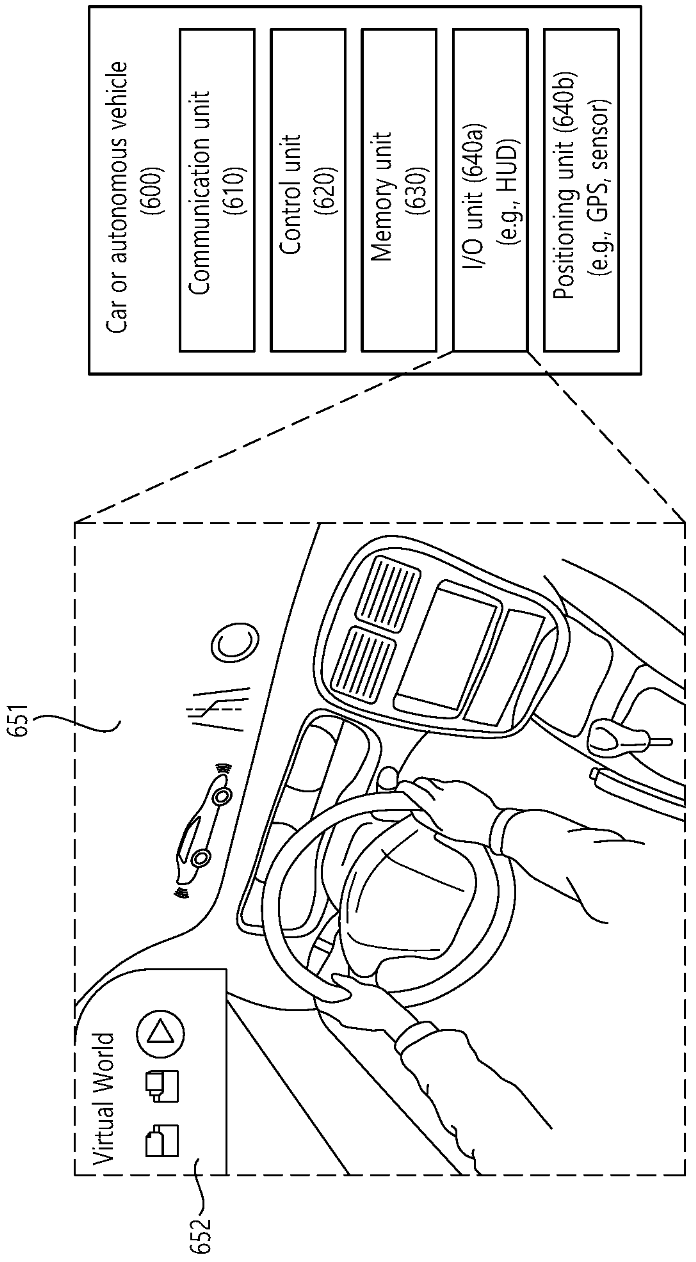
FIG. 6 is a diagram illustrating an example of a mobile object applicable to the present disclosure.

FIG. 6 is a diagram illustrating an example of a mobile object applicable to the present disclosure.

Referring to FIG. 6, the mobile object applicable to the present disclosure may be implemented as at least one of a transportation means, a train, an aerial vehicle or a ship. In addition, the mobile object applicable to the present disclosure may be implemented in the other forms and is not limited to the above-described embodiments.

In this case, referring to FIG. 6, the mobile object 600 may include a communication unit (transceiver) 610, a control unit (controller) 620, a memory unit (memory) 630, an input/output unit 640*a* and a positioning unit 640*b*. Here, the blocks 610 to 630/640*a* to 640*b* may corresponding to the blocks 310 to 330/340 of FIG. 3.

The communication unit 610 may transmit and receive signals (e.g., data, control signals, etc.) to and from external devices such as another mobile object or a base station. The control unit 620 may control the components of the mobile object 600 to perform various operations. The memory unit 630 may store data/parameters/programs/code/instructions supporting the various functions of the mobile object 600. The input/output unit 640*a* may output AR/VR objects based on information in the memory unit 630. The input/output unit 640*a* may include a HUD. The positioning unit 640*b* may acquire the position information of the mobile object 600. The position information may include absolute position information of the mobile object 600, position information in a driving line, acceleration information, position information of neighboring vehicles, etc. The positioning unit 640*b* may include a Global Positioning System (GPS) and various sensors.

For example, the communication unit 610 of the mobile object 600 may receive map information, traffic information, etc., from an external server and store the map information, the traffic information, etc., in the memory unit 630. The positioning unit 640*b* may acquire position information of the mobile object through the GPS and the various sensors and store the position information of the mobile object in the memory unit 630. The control unit 620 may generate a virtual object based on the map information, the traffic information, the mobility position information, etc., and the input/output unit 640*a* may display the generated virtual object in a glass window (651 and 652). In addition, the control unit 620 may determine whether the mobile object 600 is normally driven in the driving line based on the position information of the mobile object. When the mobile object 600 abnormally deviates from the driving line, the control unit 620 may display a warning on the glass window of the mobile object 600 through the input/output unit 640*a*. In addition, the control unit 620 may broadcast a warning message for driving abnormality to neighboring mobile objects through the communication unit 610. Depending on situations, the control unit 620 may transmit the position information of the mobile object and information about driving/mobility abnormality to a related institution through the communication unit 610.

Figure 7:
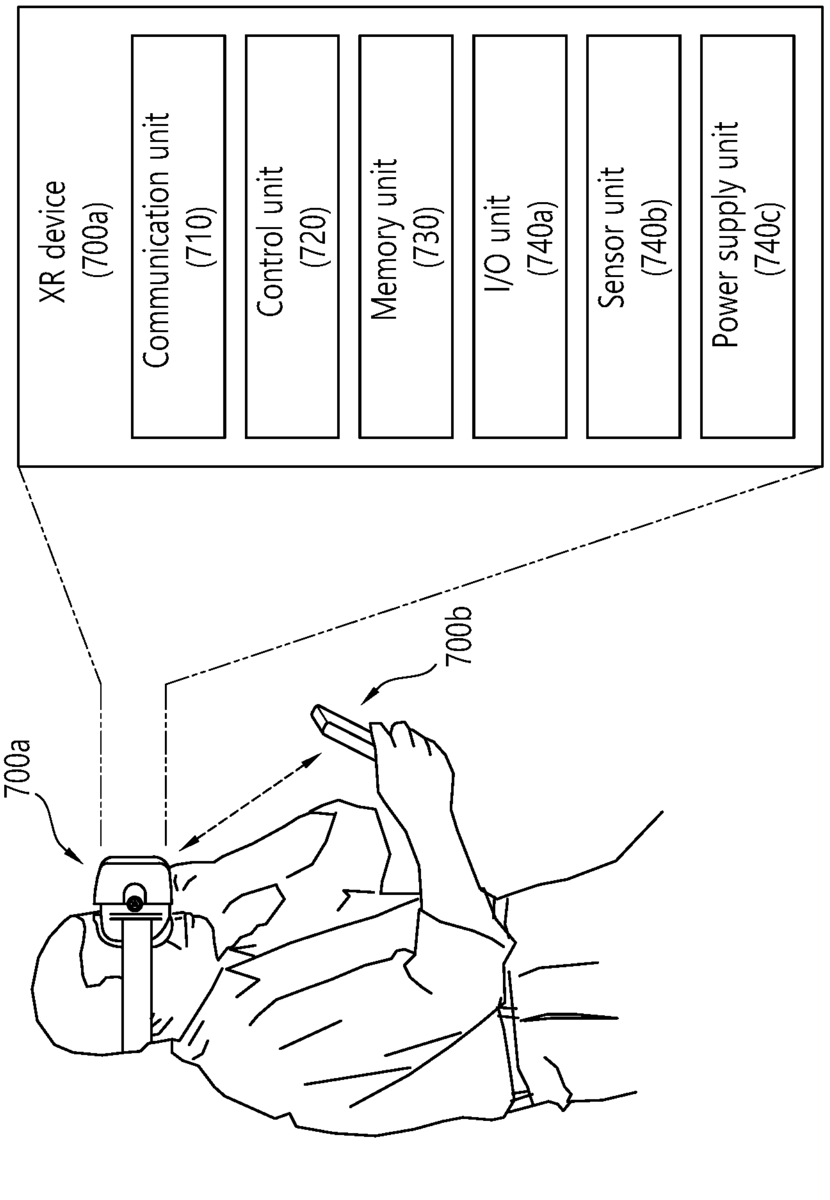
FIG. 7 is a diagram illustrating an example of an XR device applicable to the present disclosure.

FIG. 7 is a diagram illustrating an example of an XR device applicable to the present disclosure. The XR device may be implemented as an HMD, a Head-Up Display (HUD) provided in a vehicle, a television, a smartphone, a computer, a wearable device, a home appliance, a digital signage, a vehicle, a robot, etc.

Referring to FIG. 7, the XR device 700*a* may include a communication unit (transceiver) 710, a control unit (controller) 720, a memory unit (memory) 730, an input/output unit 740*a*, a sensor unit 740*b* and a power supply unit (power supply) 740*c*. Here, the blocks 710 to 730/740*a* to 740*c* may correspond to the blocks 310 to 330/340 of FIG. 3, respectively.

The communication unit 710 may transmit and receive signals (e.g., media data, control signals, etc.) to and from external devices such as another wireless device, a handheld device or a media server. The media data may include video, image, sound, etc. The control unit 720 may control the components of the XR device 700*a* to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700*a* or generate an XR object.

The input/output unit 740*a* may acquire control information, data, etc., from the outside and output the generated XR object. The input/output unit 740*a* may include a camera, a microphone, a user input unit, a display, a speaker and/or a haptic module. The sensor unit 740*b* may obtain an XR device state, surrounding environment information, user information, etc. The sensor unit 740*b* may include a proximity sensor, an illumination sensor, an acceleration sensor, a magnetic sensor, a gyro sensor, an inertia sensor, a Red Green Blue (RGB) sensor, an infrared (IR) sensor, a finger scan sensor, an ultrasonic sensor, an optical sensor, a microphone and/or a radar. The power supply unit 740*c* may supply power to the XR device 700*a* and include a wired/wireless charging circuit, a battery, etc.

For example, the memory unit 730 of the XR device 700*a* may include information (e.g., data, etc.) necessary to generate an XR object (e.g., AR/VR/MR object). The input/output unit 740*a* may acquire an instruction for driving the XR device 700*a* from a user, and the control unit 720 may drive the XR device 700*a* according to the driving instruction of the user. For example, when the user wants to watch a movie, news, etc., through the XR device 700*a*, the control unit 720 may transmit content request information to another device (e.g., a hand-held device 700*b*) or a media server through the communication unit 730. The communication unit 730 may download/stream content such as a movie or news from another device (e.g., the hand-held device 700*b*) or the media server to the memory unit 730. The control unit 720 may control and/or perform procedures such as video/image acquisition, (video/image) encoding, metadata generation/processing, etc., with respect to contents, and generate/output an XR object based on information about a surrounding space or a real object acquired through the input/output unit 740*a* or the sensor unit 740*b*.

In addition, the XR device 700*a* may be wirelessly connected with the hand-held device 700*b* through the communication unit 710, and operation of the XR device 700*a* may be controlled by the hand-held device 700*b*. For example, the hand-held device 700*b* may operate as a controller for the XR device 700*a*. To this end, the XR device 700*a* may acquire three-dimensional position information of the hand-held device 700*b* and then generate and output an XR object corresponding to the hand-held device 700*b*.

Figure 8:
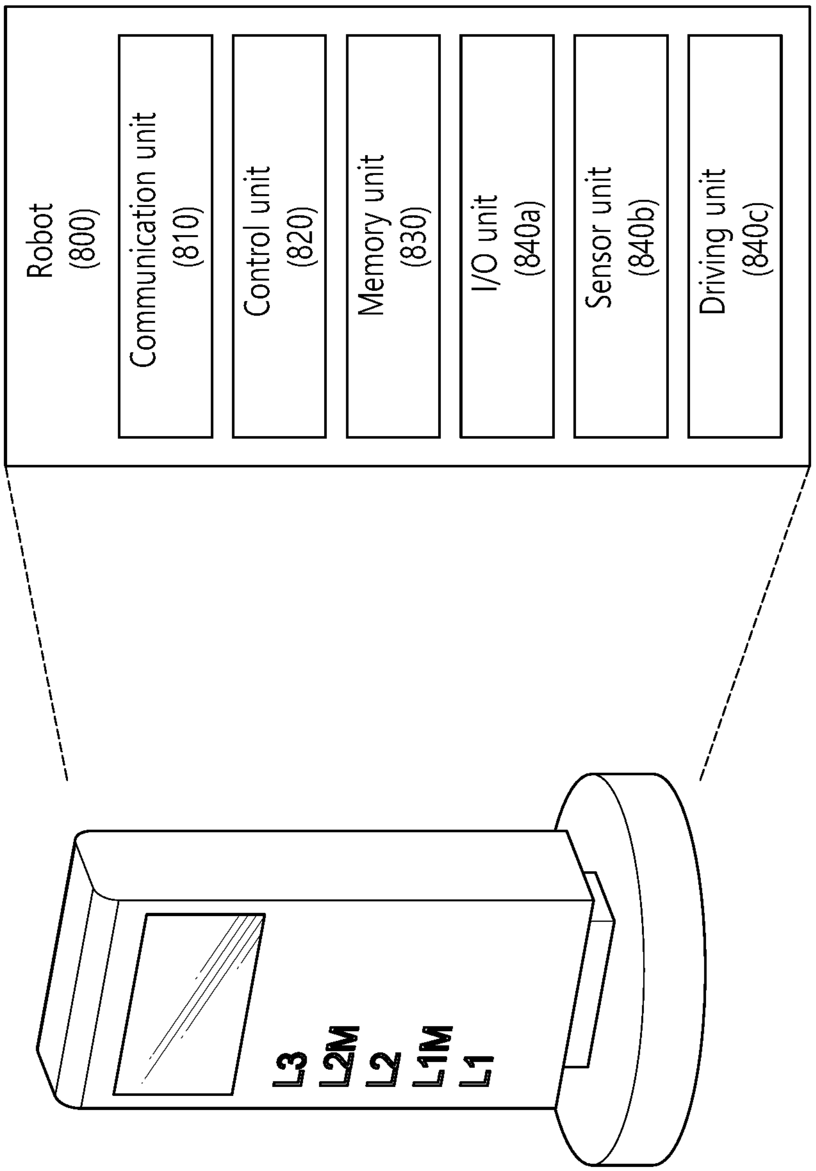
FIG. 8 is a diagram illustrating an example of a robot applicable to the present disclosure.

FIG. 8 is a diagram illustrating an example of a robot applicable to the present disclosure. For example, the robot may be classified into industrial, medical, household, military, etc., according to the purpose or field of use. In this case, referring to FIG. 8, the robot 800 may include a communication unit (transceiver) 810, a control unit (controller) 820, a memory unit (memory) 830, an input/output unit 840*a*, a sensor unit 840*b* and a driving unit 840*c*. Here, blocks 810 to 830/840*a* to 840*c* may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840*a* may acquire information from the outside of the robot 800 and output information to the outside of the robot 800. The input/output unit 840*a* may include a camera, a microphone, a user input unit, a display, a speaker and/or a haptic module.

The sensor unit 840*b* may obtain internal information, surrounding environment information, user information, etc., of the robot 800. The sensor unit 840*b* may include a proximity sensor, an illumination sensor, an acceleration sensor, a magnetic sensor, a gyro sensor, an inertia sensor, an IR sensor, a finger scan sensor, an ultrasonic sensor, an optical sensor, a microphone and/or a radar.

The driving unit 840*c* may perform various physical operations such as movement of robot joints. In addition, the driving unit 840*c* may cause the robot 800 to run on the ground or fly in the air. The driving unit 840*c* may include an actuator, a motor, wheels, a brake, a propeller, etc.

Figure 9:
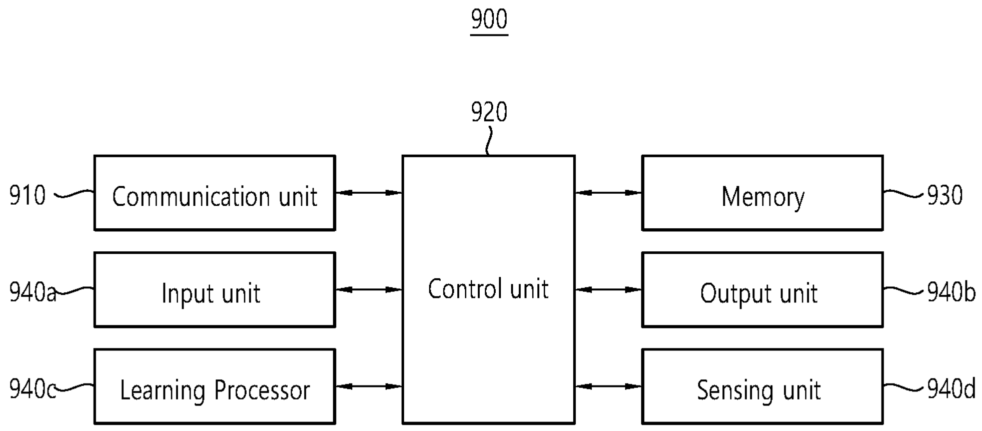
FIG. 9 is a diagram illustrating an example of an Artificial Intelligence (AI) device applicable to the present disclosure.

FIG. 9 is a diagram illustrating an example of an Artificial Intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a Set-Top Box (STB), a radio, a washing machine, a refrigerator, a digital signage, a robot, a vehicle, or the like.

Referring to FIG. 9, the AI device 900 may include a communication unit (transceiver) 910, a control unit (controller) 920, a memory unit (memory) 930, an input/output unit 940*a*/940*b*, a leaning processor unit (learning processor) 940*c* and a sensor unit 940*d*. The blocks 910 to 930/940*a* to 940*d* may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940*c* or the memory unit 930, and control the components of the AI device 900 to perform a predicted operation or an operation determined to be desirable from among at least one executable operation. In addition, the control unit 920 may collect history information including operation of the AI device 900 or user's feedback about the operation and store the history information in the memory unit 930 or the learning processor unit 940*c* or transmit the history information to the AI server (FIG. 1, 140). The collected history information may be used to update a learning model.

The memory unit 930 may store data supporting various functions of the AI device 900. For example, the memory unit 930 may store data obtained from the input unit 940*a*, data obtained from the communication unit 910, output data of the learning processor unit 940*c*, and data obtained from the sensing unit 940. In addition, the memory unit 930 may store control information and/or software code necessary to operate/execute the control unit 920.

The input unit 940*a* may acquire various types of data from the outside of the AI device 900. For example, the input unit 940*a* may acquire learning data for model learning, input data to which the learning model will be applied, etc. The input unit 940*a* may include a camera, a microphone and/or a user input unit. The output unit 940*b* may generate video, audio or tactile output. The output unit 940*b* may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, an RGB sensor, an IR sensor, a finger scan sensor, an ultrasonic sensor, an optical sensor, a microphone and/or a radar.

The learning processor unit 940*c* may train a model composed of an artificial neural network using training data. The learning processor unit 940*c* may perform AI processing along with the learning processor unit of the AI server (FIG. 1, 140). The learning processor unit 940*c* may process information received from an external device through the communication unit 910 and/or information stored in the memory unit 930. In addition, the output value of the learning processor unit 940*c* may be transmitted to the external device through the communication unit 910 and/or stored in the memory unit 930.

Hereinafter, physical channels and general signal transmissions are described.

In a radio access system, a UE receives information from a base station on a Downlink (DL) and transmits information to the base station on an Uplink (UL). The information transmitted and received between the UE and the base station includes general data information and a variety of control information. There are many physical channels according to the types/usages of information transmitted and received between the base station and the UE.

Figure 10:
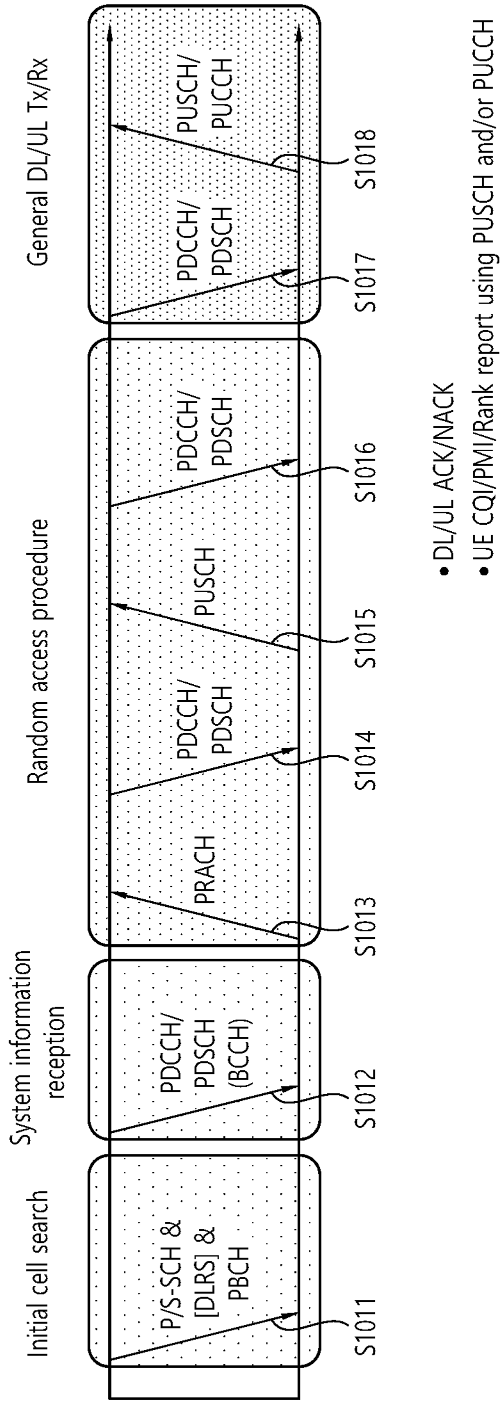
FIG. 10 is a diagram illustrating physical channels and a signal transmission method using the same applicable to the present disclosure.

FIG. 10 is a diagram illustrating physical channels and a signal transmission method using the same applicable to the present disclosure.

In step S1011, the UE which is turned on again in a state of being turned off or has newly entered a cell performs initial cell search operation such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a Physical Broadcast Channel (PBCH) signal from the base station and acquire broadcast information in the cell. Meanwhile, the UE may receive a Downlink Reference Signal (DL RS) in an initial cell search step and check a downlink channel state. In step S1012, the UE which has completed initial cell search may receive a Physical Downlink Control Channel (PDCCH) and a Physical Downlink Shared Channel (PDSCH) according to physical downlink control channel information, thereby acquiring more detailed system information.

Thereafter, the UE may perform a random access procedure such as steps S1013 to S1016 in order to complete access to the base station. To this end, the UE may transmit a preamble through a Physical Random Access Channel (PRACH) (S1013) and receive a Random Access Response (RAR) for the preamble through a physical downlink control channel and a physical downlink shared channel corresponding thereto (S1014). The UE may transmit a Physical Uplink Shared Channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a Physical Uplink Shared Channel (PUSCH) signal and/or a Physical Uplink Control Channel (PUCCH) signal (S1018) as general uplink/downlink signal transmission procedures.

The control information transmitted from the UE to the base station is collectively referred to as Uplink Control Information (UCI). The UCI includes Hybrid Automatic Repeat and request Acknowledgement/Negative-ACK (HARQ-ACK/NACK), Scheduling Request (SR), Channel Quality Indication (CQI), Precoding Matrix Indication (PMI), Rank Indication (RI), Beam Indication (BI) information, etc. In this case, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 11:
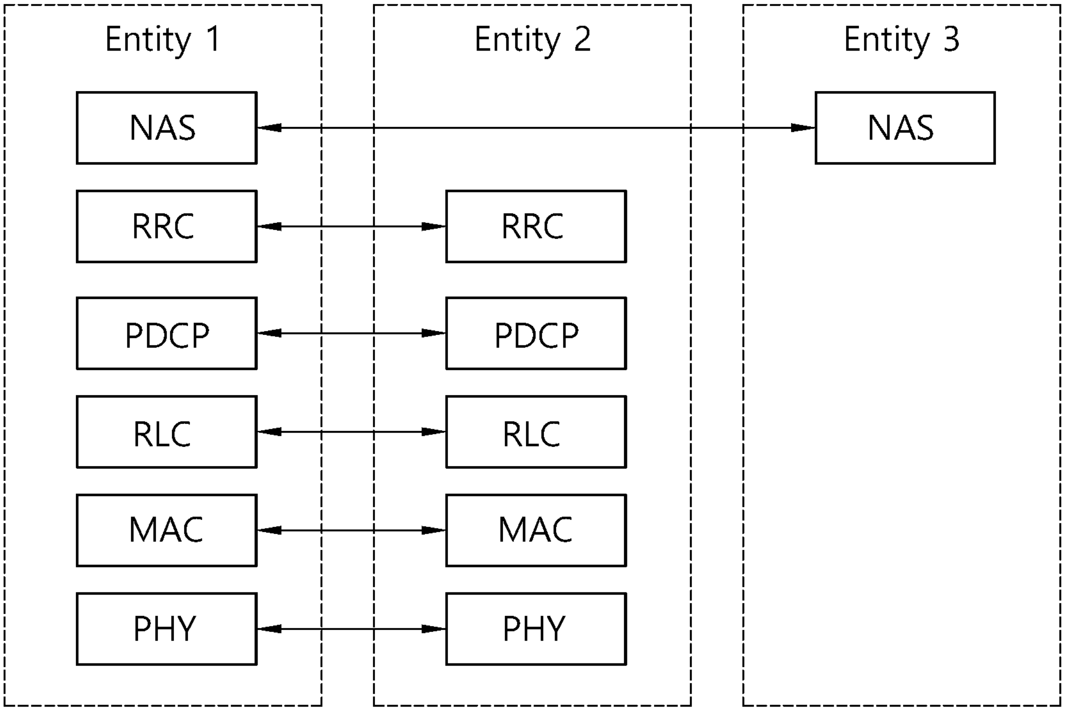
FIG. 11 is a diagram illustrating a structure of a control plane and a user plane of a radio interface protocol applicable to the present disclosure.
Figure 11:
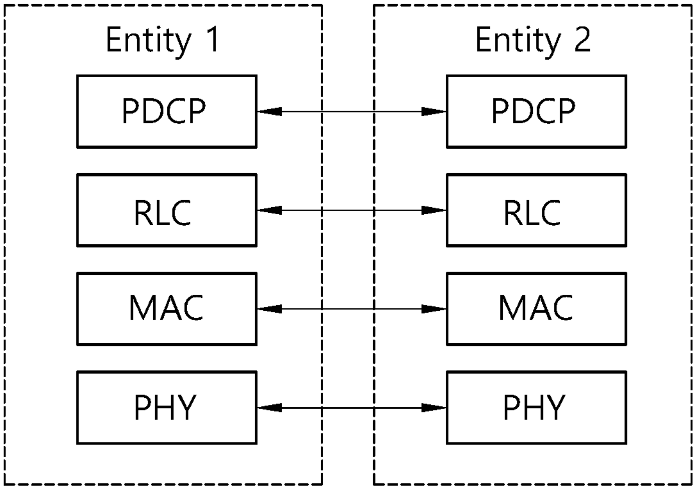

FIG. 11 is a diagram illustrating a structure of a control plane and a user plane of a radio interface protocol applicable to the present disclosure.

Referring to FIG. 11, an entity 1 may be a User Equipment (UE). In this case, the UE may be at least one of a wireless device, a hand-held device, a vehicle, a mobile object, an XR device, a robot or an AI device, to which the present disclosure is applicable in FIGS. 1 to 9. In addition, the UE refers to a device to which the present disclosure is applicable, and is not limited to a specific apparatus or device.

An entity 2 may be a base station. In this case, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

An entity 3 may be a network apparatus or a device for performing a network function. In this case, the network apparatus may be a core network node for managing mobility (e.g., Mobility Management Entity (MME), an Access and mobility Management Function (AMF), etc.). In addition, the network function may refer a function implemented in order to perform a network function. The entity 3 may be a device to which a function is applied. That is, the entity 3 may refer to a function or device for performing a network function and is not limited to a specific device.

A control plane refers to a path used for transmission of control messages, which are used by the UE and the network to manage a call. A user plane refers to a path in which data generated in an application layer, e.g., voice data or Internet packet data, is transmitted. In this case, the physical layer, the first layer, may provide information transfer services to the upper layers using physical channels. The physical layer is connected to the upper Medium Access Control (MAC) layer through a transport channel. In this case, data may be transferred between the MAC layer and the physical layer through the transport channel. Data may be transferred between the physical layer on the transmitting side and the receiving side through the physical channel. In this case, the physical channel utilizes time and frequency as radio resources.

The Medium Access Control (MAC) layer of the second layer provides services to the upper Radio Link Control (RLC) layer through logical channels. The RLC layer of the second layer may support reliable data transmission. The function of the RLC layer may be implemented by a functional block within the MAC layer. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having relatively narrow bandwidth. A Radio Resource Control (RRC) layer located at the bottom-most portion of the third layer is defined only in the control plane. The RRC layer serves to control logical channels, transport channels, and physical channels in relation to configuration, re-configuration, and release of radio bearers. A Radio Bearer (RB) refers to a service provided by the second layer to transmit data between the UE and the network. To this end, the RRC layer of the UE and the RRC layer of the network may exchange RRC messages. A Non-Access Stratum (NAS) layer located at an upper level of the RRC layer performs functions such as session management and mobility management, etc. One cell configuring a base station may be configured with one of various bandwidths to provide a downlink or uplink transmission service to several UEs. Different cells may be configured to provide different bandwidths. Downlink transport channels for transmitting data from a network to a UE may include a Broadcast Channel (BCH) for transmitting system information, a Paging Channel (PCH) for transmitting paging messages, and a DL Shared Channel (DL-SCH) for transmitting user traffic or control messages. Traffic or control messages of a DL multicast or broadcast service may be transmitted through the DL-SCH or may be transmitted through a separate DL Multicast Channel (MCH). Meanwhile, UL transport channels for transmitting data from the UE to the network include a Random Access Channel (RACH) for transmitting initial control messages and a UL-SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 12:
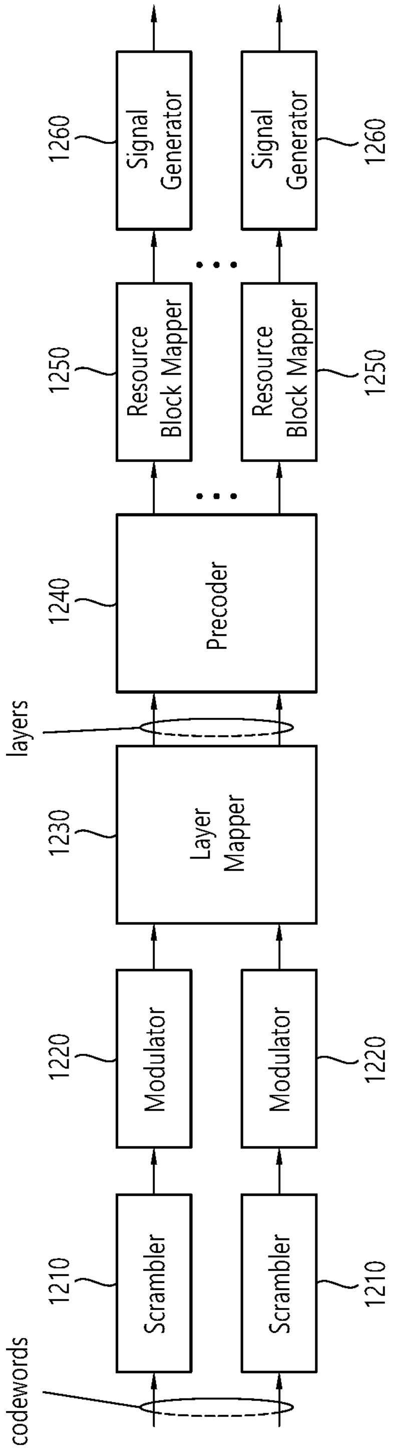
FIG. 12 is a diagram illustrating a method of processing a transmitted signal applicable to the present disclosure.

FIG. 12 is a diagram illustrating a method of processing a transmitted signal applicable to the present disclosure. For example, the transmitted signal may be processed by a signal processing circuit. In this case, a signal processing circuit 1200 may include a scrambler 1210, a modulator 1220, a layer mapper 1230, a precoder 1240, a resource mapper 1250, and a signal generator 1260. In this case, for example, the operation/function of FIG. 12 may be performed by the processors 202*a* and 202*b* and/or the transceiver 206*a* and 206*b* of FIG. 2. In addition, for example, the hardware element of FIG. 12 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 1210 to 1250 may be implemented in the processors 202*a* and 202*b* of FIG. 2 and a block 1260 may be implemented in the transceivers 206*a* and 206*b* of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a scrambled bit sequence by the scrambler 1210. The scramble sequence used for scramble is generated based on an initial value and the initial value may include ID information of a wireless device, etc. The scrambled bit sequence may be modulated into a modulated symbol sequence by the modulator 1220. The modulation scheme may include pi/2-Binary Phase Shift Keying (pi/2-BPSK), m-Phase Shift Keying (m-PSK), m-Quadrature Amplitude Modulation (m-QAM), etc.

A complex modulation symbol sequence may be mapped to one or more transmission layer by the layer mapper 1230. Modulation symbols of each transmission layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transmission layers. Here, the precoder 1240 may perform precoding after transform precoding (e.g., Discrete Fourier Transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna. To this end, the signal generator 1260 may include an Inverse Fast Fourier Transform (IFFT) module, a Cyclic Prefix (CP) insertor, a Digital-to-Analog Converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an Analog-to-Digital Converter (ADC), a CP remover, and a Fast Fourier Transform (FFT) module. Thereafter, the baseband signal may be restored to a codeword through a resource de-mapper process, a post-coding process, a demodulation process and a de-scrambling process. The codeword may be restored to an original information block through decoding. Accordingly, a signal processing circuit (not shown) for a received signal may include a signal restorer, a resource de-mapper, a post-coder, a demodulator, a de-scrambler and a decoder.

Figure 13:
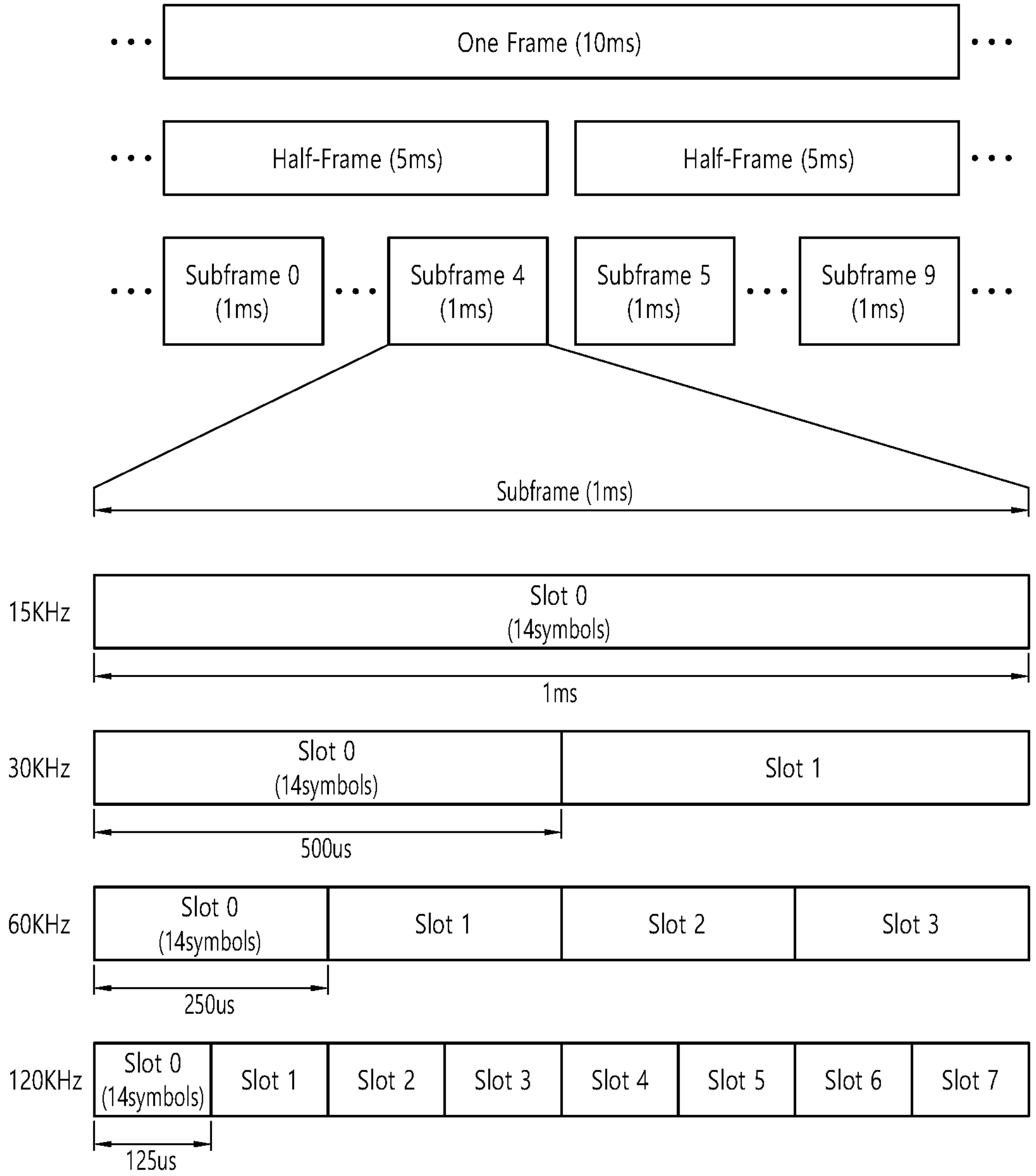
FIG. 13 is a diagram illustrating a structure of a radio frame applicable to the present disclosure.

FIG. 13 is a diagram illustrating a structure of a radio frame applicable to the present disclosure.

UL and DL transmission based on an NR system may be based on the frame shown in FIG. 13. In this case, one radio frame has a length of 10 ms and may be defined as two 5-ms Half-Frames (HFs). One half-frame may be defined as five 1-ms subframes (SFs). One subframe may be divided into one or more slots and the number of slots in the subframe may depend on Subscriber Spacing (SCS). In this case, each slot may include 12 or 14 OFDM(A) symbols according to Cyclic Prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot, the number of slots per frame and the number of slots per subframe according to SCS when normal CP is used, and Table 2 shows the number of symbols per slot, the number of slots per frame and the number of slots per subframe according to SCS when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, $N^{slot}{}_{symb}$ may indicate the number of symbols in a slot, $N^{frame,\mu}{}_{slot}$ may indicate the number of slots in a frame, and $N^{subframe,\mu}{}_{slot}$ may indicate the number of slots in a subframe.

In addition, in a system to which the present disclosure is applicable, OFDM(A) numerology (e.g., SCS, CP length, etc.) may be differently configured among a plurality of cells merged to one UE. Accordingly, an (absolute time) period of a time resource (e.g., an SF, a slot or a TTI) (for convenience, collectively referred to as a Time Unit (TU)) composed of the same number of symbols may be differently configured between merged cells.

NR may support a plurality of numerologies (or Subscriber Spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system to which the present disclosure is applicable, the above-described numerology may be differently configured. For example, a Terahertz wave (THz) band may be used as a frequency band higher than FR2. In the THz band, the SCS may be configured greater than that of the NR system, and the number of slots may be differently configured, without being limited to the above-described embodiments. The THz band will be described below.

Figure 14:
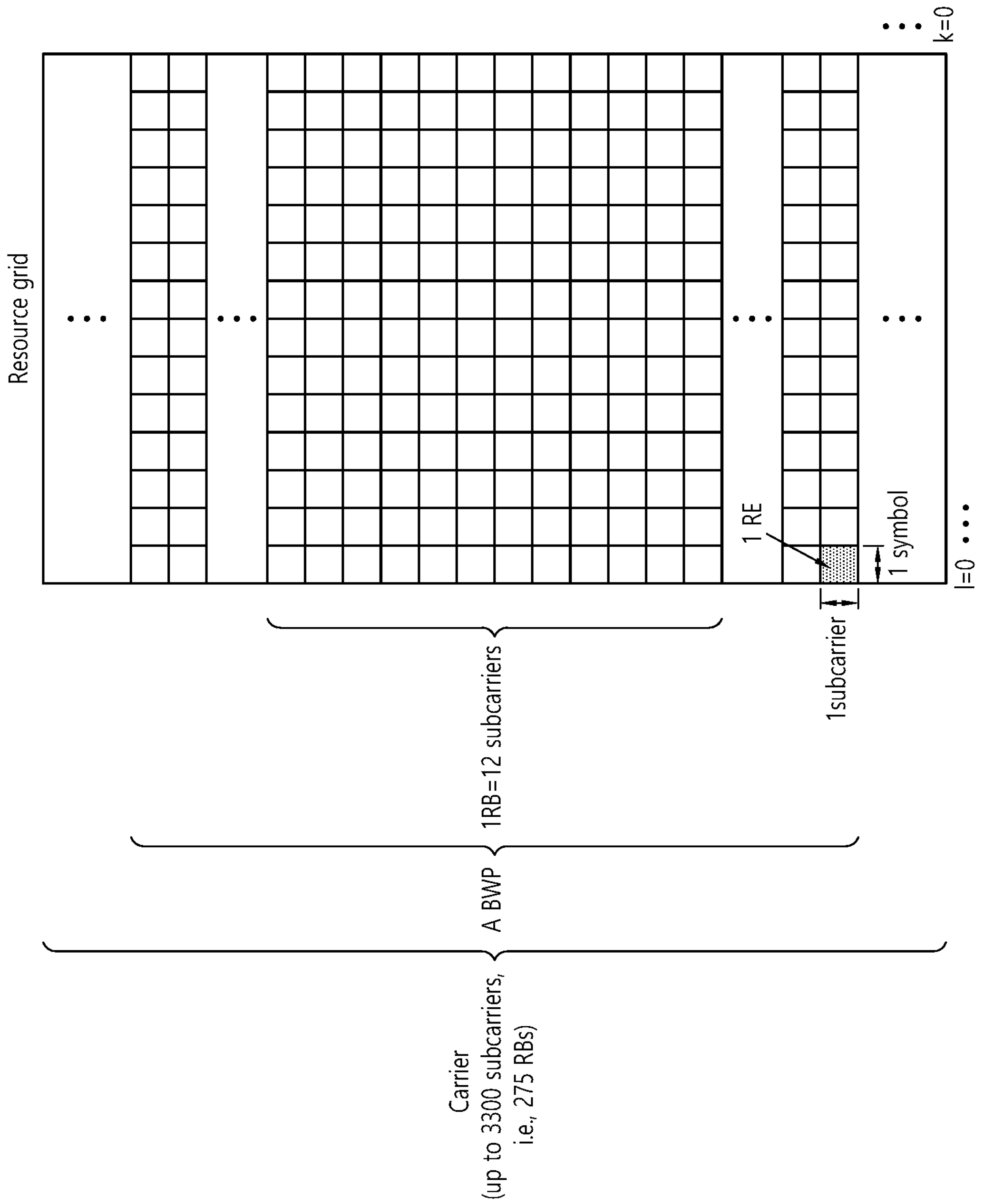
FIG. 14 is a diagram illustrating a slot structure applicable to the present disclosure.

FIG. 14 is a diagram illustrating a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A Resource Block (RB) may be defined as a plurality (e.g., 12) of consecutive subcarriers in the frequency domain.

In addition, a Bandwidth Part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a Resource Element (RE) and one complex symbol may be mapped.

Hereinafter, a 6G communication system is described.

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

In this case, the 6G system may have key factors such as enhanced Mobile Broadband (eMBB), Ultra-Reliable Low Latency Communications (URLLC), massive Machine Type Communications (mMTC), AI integrated communication, tactile Internet, high throughput, high network capacity, high energy efficiency, low backhaul and access network congestion and enhanced data security.

Figure 15:
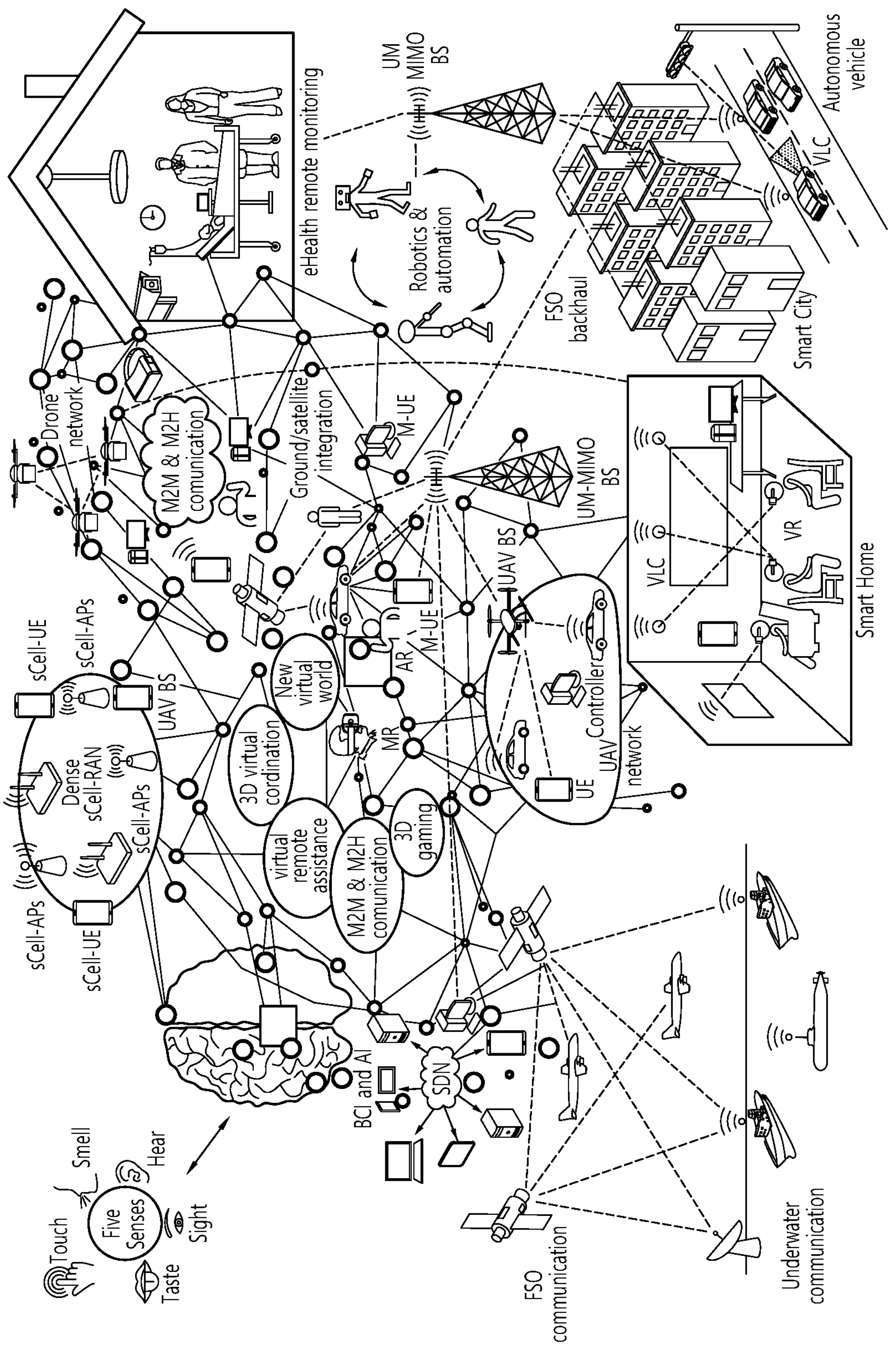
FIG. 15 is a diagram illustrating an example of a communication structure providable in a 6G system applicable to the present disclosure.

FIG. 15 is a diagram illustrating an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. In this case, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, Wireless Information and Energy Transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and Beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and Free Space Optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Hereinafter, core implementation technologies of 6G system are described.

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a Brain Computer Interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, Multiple Input Multiple Output (MIMO) mechanisms based on deep learning, resource scheduling and allocation based on AI, etc., may be included.

Machine learning may be used for channel estimation and channel tracking and may be used for power allocation, interference cancellation, etc., in the physical layer of DL. In addition, machine learning may be used for antenna selection, power control, symbol detection, etc., in the MIMO system.

However, application of a Deep Neutral Network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Such static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, i.e., supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to the input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning rate may be differently applied according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the characteristics of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a Deep Neural Network (DNN) method, a Convolutional deep Neural Network (CNN) method and a Recurrent Boltzmman machine (RNN) method. Such a learning model may be applied.

Hereinafter, a Terahertz (THz) communication is described.

THz communication is applicable to the 6G system. For example, a data rate may increase by increasing bandwidth. This may be performed by using sub-TH communication with wide bandwidth and applying advanced massive MIMO technology.

Figure 16:
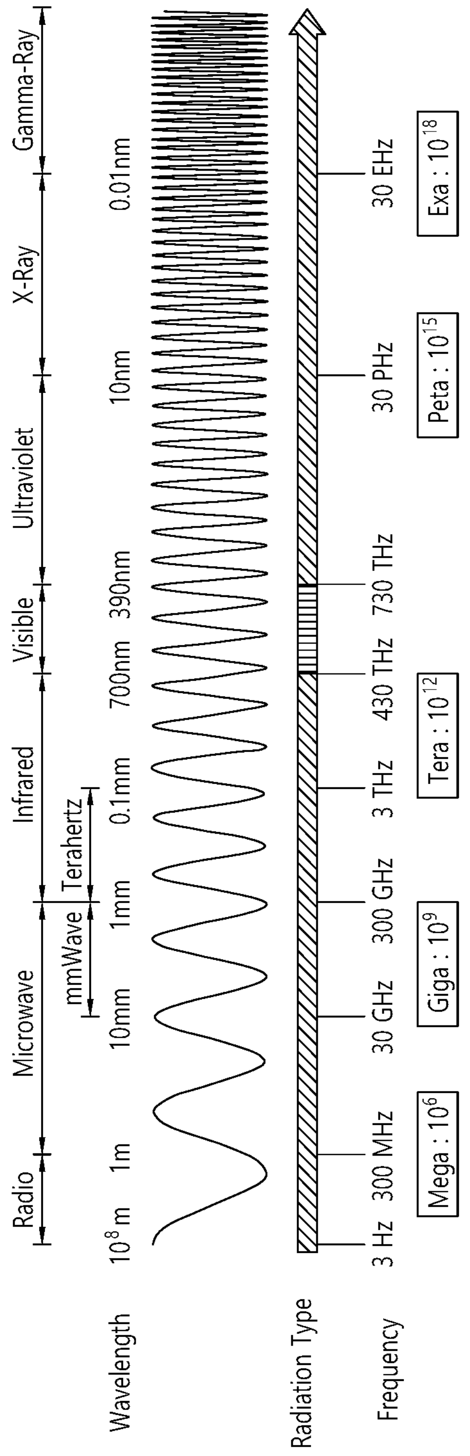
FIG. 16 is a diagram illustrating an electromagnetic spectrum applicable to the present disclosure.

FIG. 16 is a diagram illustrating an electromagnetic spectrum applicable to the present disclosure. For example, referring to FIG. 16, THz waves which are known as sub-millimeter radiation, generally refers a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far IR frequency band. A band of 300 GHz to 3 THz is a part of an optical band but is at the border of the optical band and is just behind an RF band. Accordingly, the band of 300 GHz to 3 THz has similarity with RF. The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Hereinafter, an optical wireless technology is described.

Optical Wireless Communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as Free Space Optical (FSO) communication based on light fidelity, visible light communication, optical camera communication and wide band are well-known technologies. Communication based on optical wireless technology may provide a very high data rate, low latency and safe communication. Light Detection and Ranging (LiDAR) may also be used for ultra-high resolution 3D mapping in 6G communication based on wide band.

Hereinafter, an FSO backhaul network is described.

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Hereinafter, a massive MIMO technology is described.

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Hereinafter, a blockchain is described.

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a Peer-to-Peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

Hereinafter, a 3D networking is described.

The 6G system integrates terrestrial and aerial networks to support vertical expansion of user communication. A 3D BS will be provided through low-orbit satellites and UAVs. Adding new dimensions in terms of altitude and related degrees of freedom makes 3D connections significantly different from existing 2D networks.

Hereinafter, a quantum communication is described.

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Hereinafter, an unmanned aerial vehicle is described.

An Unmanned Aerial Vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC.

The UAV can also serve a number of purposes, such as network connectivity improvement, fire detection, disaster emergency services, security and surveillance, pollution monitoring, parking monitoring, and accident monitoring, etc. Therefore, UAV technology is recognized as one of the most important technologies for 6G communication.

Hereinafter, cell-free communication is described.

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Hereinafter, Wireless Information and Energy Transfer (WIET) is described.

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Hereinafter, integration of sensing and communication is described.

An autonomous wireless network is a function for continuously detecting a dynamically changing environment state and exchanging information between different nodes. In 6G, sensing will be tightly integrated with communication to support autonomous systems.

Hereinafter, integration of access backhaul network is described.

In 6G, the density of access networks will be enormous. Each access network is connected by optical fiber and backhaul connection such as FSO network. To cope with a very large number of access networks, there will be a tight integration between the access and backhaul networks.

Hereinafter, hologram beamforming is described.

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram Beamforming (HBF) is a new beamforming method that differs significantly from MIMO systems because this uses a software-defined antenna. HBF will be a very effective approach for efficient and flexible transmission and reception of signals in multi-antenna communication devices in 6G.

Hereinafter, big data analysis is described.

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Hereinafter, Large Intelligent Surface (LIS) is described.

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, i.e., signals are only passively reflected without using active RF chains. In addition, since each of the passive reflectors of the LIS should independently adjust the phase shift of an incident signal, this may be advantageous for wireless communication channels. By properly adjusting the phase shift through an LIS controller, the reflected signal can be collected at a target receiver to boost the received signal power.

Hereinafter, a THz wireless communication is described.

Figure 17:
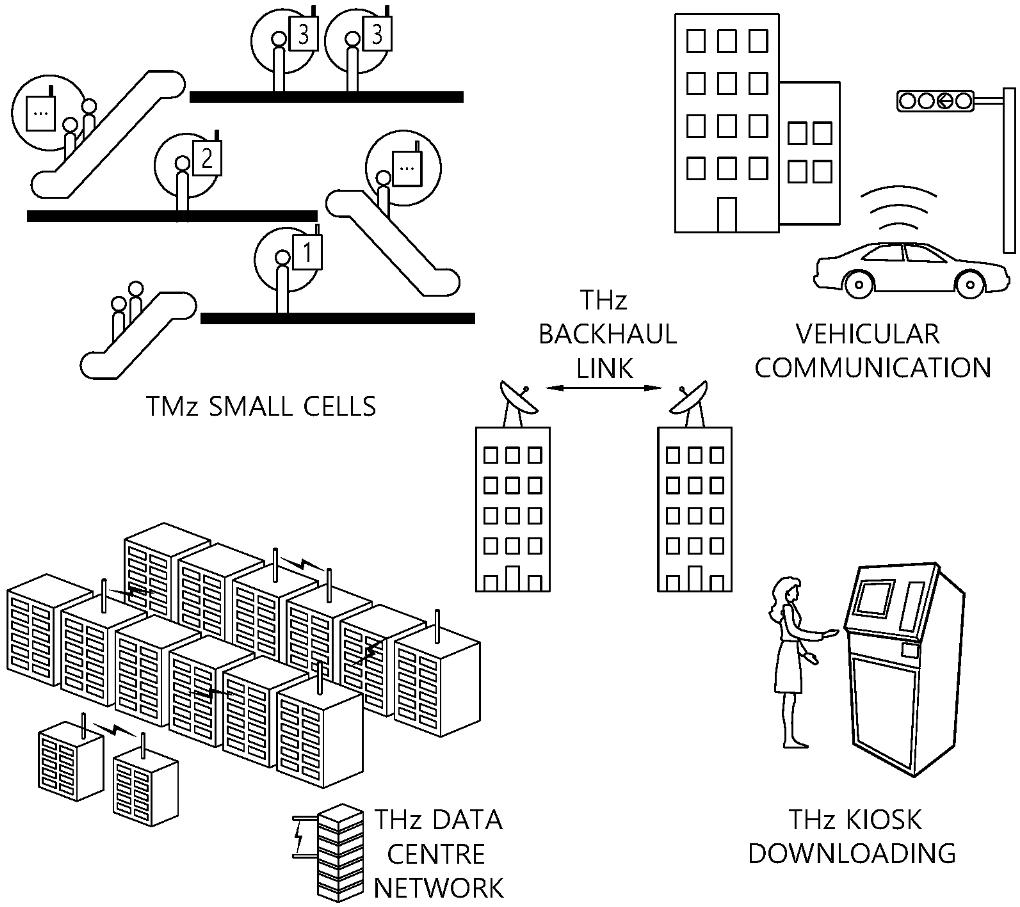
FIG. 17 is a diagram illustrating a THz communication method applicable to the present disclosure.

FIG. 17 is a diagram illustrating a THz communication method applicable to the present disclosure.

Referring to FIG. 17, THz wireless communication uses a THz wave having a frequency of approximately 0.1 to 10 THz (1 THz=1012 Hz), and may refer terahertz (THz) band wireless communication using a very high carrier frequency of 100 GHz or more. The THz wave is located between Radio Frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion about THz wireless communication is being discussed mainly in IEEE 802.15 THz Working Group (WG) in addition to 3GPP, and standard documents issued by a Task Group (TG) of IEEE 802.15 (e.g., TG3d, TG3e) specify and supplement the description of the present disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to Vehicle-to-Vehicle (V2V) connection and backhaul/fronthaul connection. In the micro network, THz wireless communication may be applied to near-field communication such as fixed point-to-point or multi-point connection such as wireless connection in indoor small cells, a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 18:
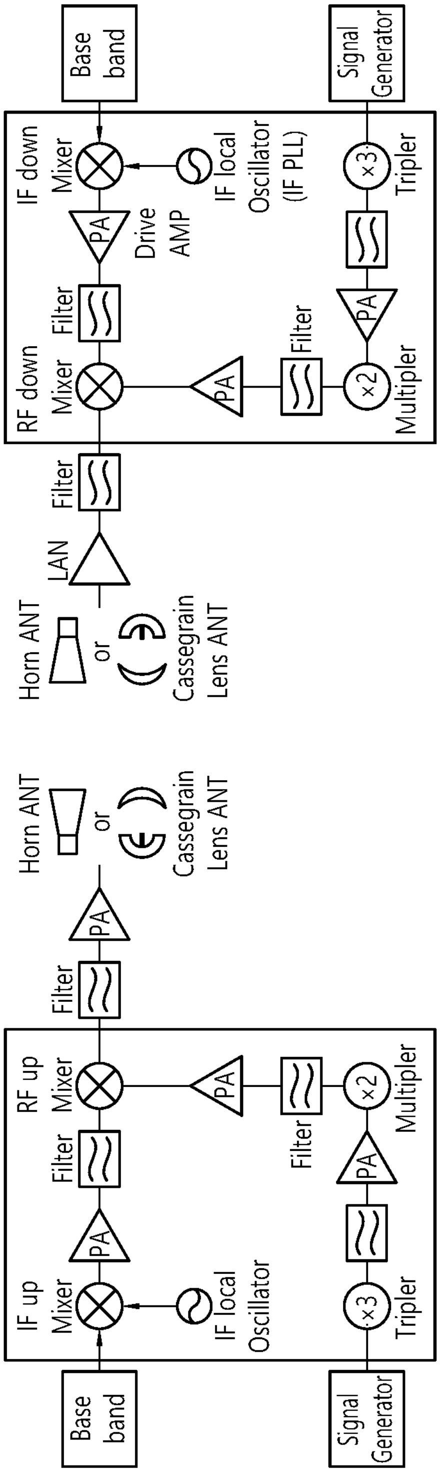
FIG. 18 is a diagram illustrating a THz wireless communication transceiver applicable to the present disclosure.

FIG. 18 is a diagram illustrating a THz wireless communication transceiver applicable to the present disclosure.

Referring to FIG. 18, THz wireless communication may be classified based on the method of generating and receiving THz. The THz generation method may be classified as an optical device-based or electronic device-based technology.

In this case, the method of generating THz using an electronic device includes a method using a semiconductor device such as a Resonance Tunneling Diode (RTD), a method using a local oscillator and a multiplier, a Monolithic Microwave Integrated Circuit (MMIC) method using a compound semiconductor High Electron Mobility Transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF refers an intermediate frequency, a tripler and a multiplier refers a multiplier, PA refers a power amplifier, LNA refers a low noise amplifier, and PLL refers a phase-locked loop.

Figure 19:
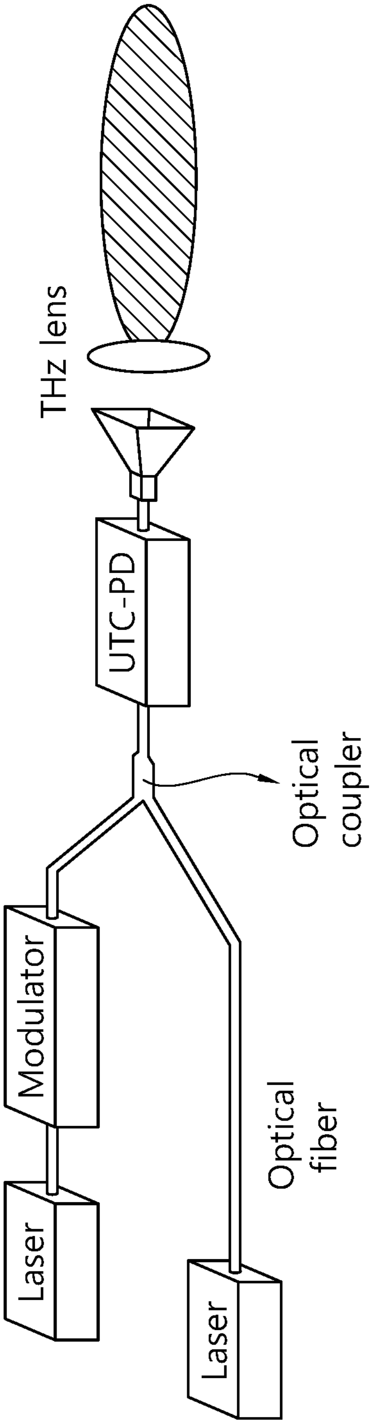
FIG. 19 is a diagram illustrating a THz signal generation method applicable to the present disclosure.
Figure 20:
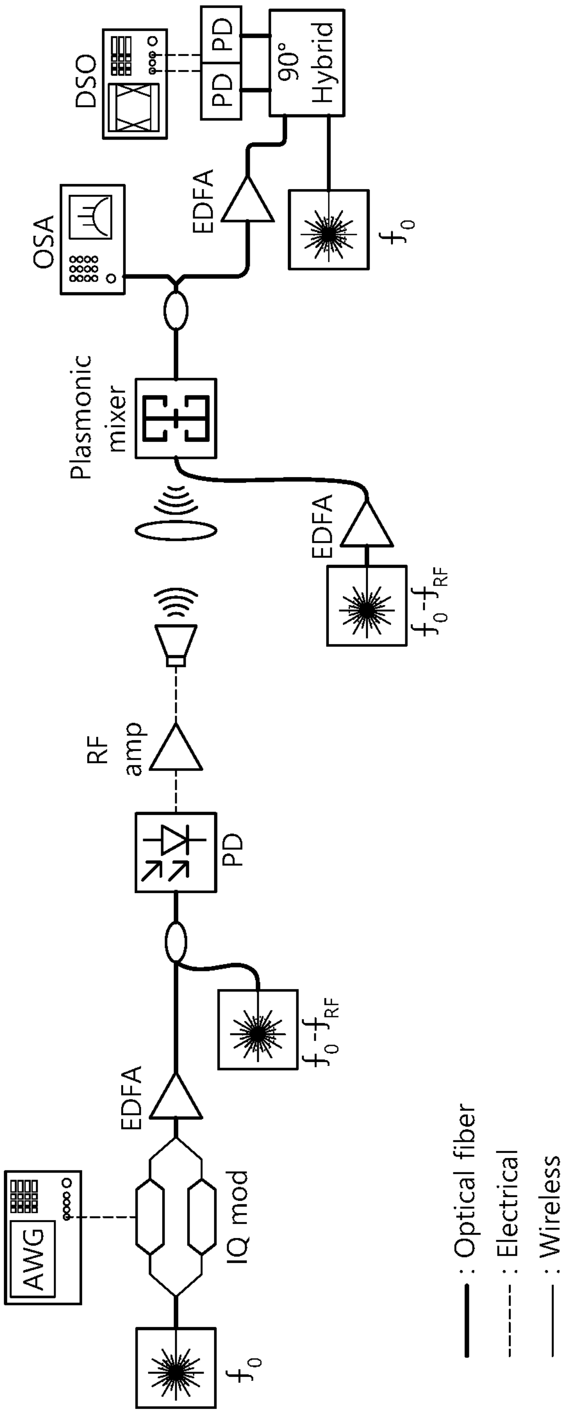
FIG. 20 is a diagram illustrating a wireless communication transceiver applicable to the present disclosure.

FIG. 19 is a diagram illustrating a THz signal generation method applicable to the present disclosure. FIG. 20 is a diagram illustrating a wireless communication transceiver applicable to the present disclosure.

Referring to FIGS. 19 and 20, the optical device-based THz wireless communication technology refers a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor device that transmits an electrical signal using light waves to provide coupling with electrical isolation between circuits or systems, and a Uni-Travelling Carrier Photo-Detector (UTC-PD) is one of photodetectors, which uses electrons as an active carrier and reduces the travel time of electrons by bandgap grading. The UTC-PD is capable of photodetection at 150 GHz or more. In FIG. 20, an Erbium-Doped Fiber Amplifier (EDFA) refers an optical fiber amplifier to which erbium is added, a Photo Detector (PD) refers a semiconductor device capable of converting an optical signal into an electrical signal, and OSA refers an optical sub assembly in which various optical communication functions (e.g., photoelectric conversion, electrophotic conversion, etc.) are modularized as one component, and DSO refers a digital storage oscilloscope.

Figure 21:
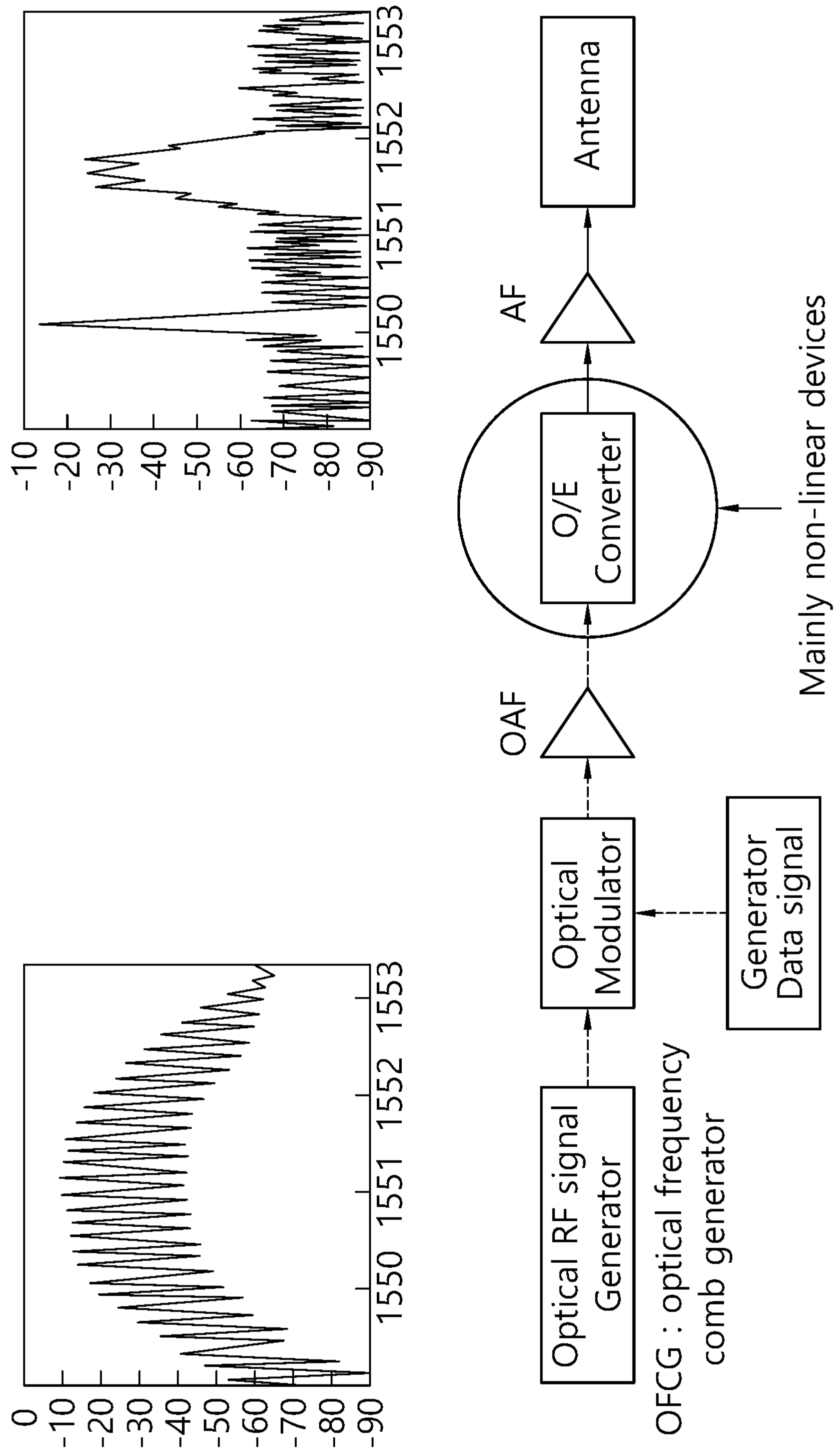
FIG. 21 is a diagram illustrating a transmitter structure applicable to the present disclosure.
Figure 22:
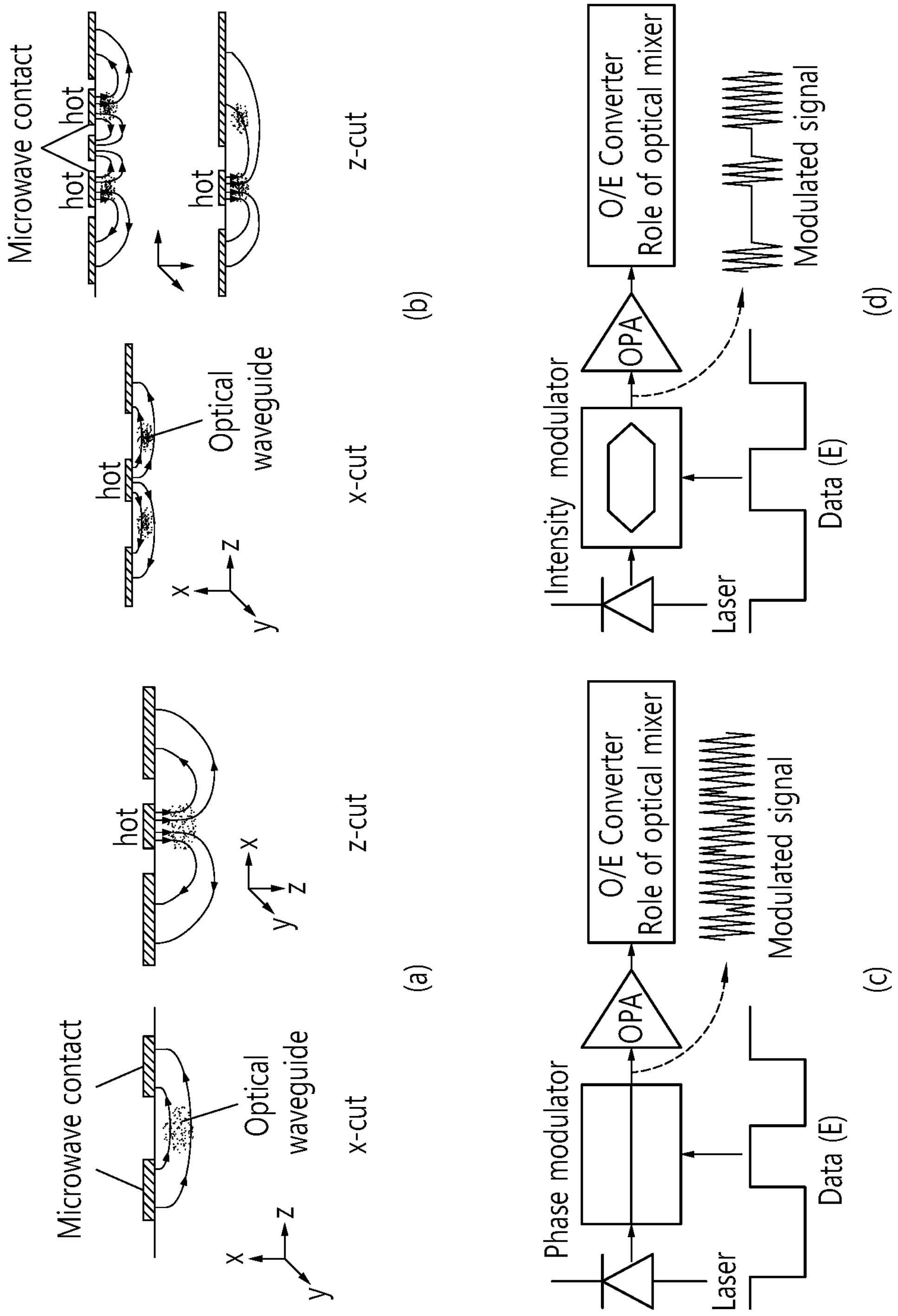
FIG. 22(*a*), FIG. 22(*b*), FIG. 22(*c*), FIG. 22(*d*) are diagrams illustrating a modulator structure applicable to the present disclosure.

FIG. 21 is a diagram illustrating a transmitter structure applicable to the present disclosure FIG. 22 is a diagram illustrating a modulator structure applicable to the present disclosure.

Referring to FIGS. 21 and 22, generally, the optical source of the laser may change the phase of a signal by passing through the optical wave guide. In this case, data is carried by changing electrical characteristics through microwave contact or the like. Thus, the optical modulator output is formed in the form of a modulated waveform. An O/E converter may generate THz pulses according to optical rectification operation by a nonlinear crystal, O/E conversion by a photoconductive antenna, and emission from a bunch of relativistic electrons, etc. The THz pulse generated in the above manner may have a length of a unit from femto seconds to pico seconds. The O/E converter performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the THz pulse for one carrier is set to 5 ps, the Bandwidth (BW) is about 20 GHz.

Effective down conversion from the infrared band to the terahertz band depends on how to utilize the nonlinearity of the O/E converter. That is, for down-conversion into a desired THz band, design of the O/E converter having the most ideal non-linearity to move to the corresponding THz band is required. If the O/E converter which is not suitable for a target frequency band is used, there is a high possibility that an error occurs with respect to the amplitude and phase of the corresponding pulse.

In a single carrier system, a terahertz transmission/reception system may be implemented using one O/E converter. In a multi-carrier system, as many O/E converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the O/E converter may be transmitted in a specific resource region (e.g., a specific frame). The frequency domain of the specific resource region may include a plurality of chunks. Each chunk may be composed of at least one Component Carrier (CC).

Hereinafter, proposals of the present disclosure are described.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Federated learning is one of the techniques of distributed machine learning, in which multiple devices that are the subject of learning share parameters such as weight and gradient of the local model with the server, and the server updates the global parameter by aggregating the local model parameters of each device. In this process, the raw data of each device is not shared, which reduces the communication overhead in the data transmission process and protects privacy.

Figure 23:
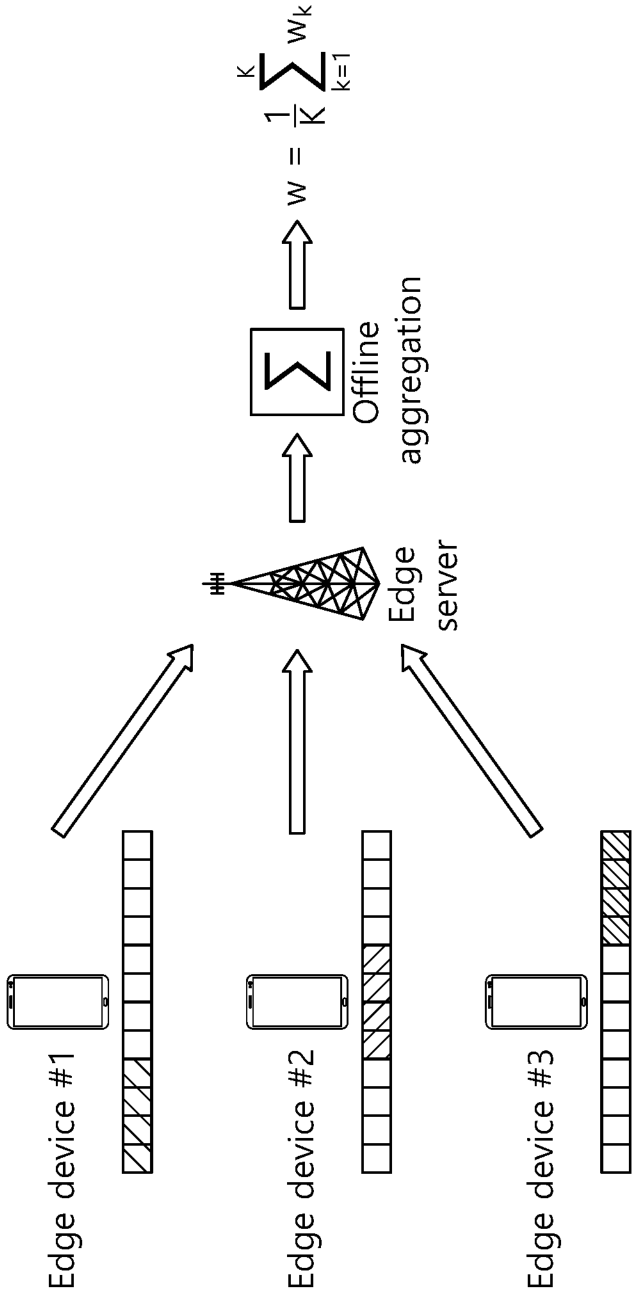
FIG. 23 illustrates an example of a federated learning operation process based on orthogonal division access.

FIG. 23 illustrates an example of a federated learning operation process based on orthogonal division access.

Federated learning based on conventional orthogonal multiple access works as shown in FIG. 23. Devices transmit local parameters over their respective allocated resources, and the server performs offline aggregation on the neural network parameters received from the devices. Typically, the server derives global parameters by averaging over all local neural network parameters and transmits them back to the devices. However, since different devices use different resources to perform learning, under limited resources, the time and uplink traffic requirement to update the global parameters increases as the number of devices participating in learning increases.

Here, the aggregated uplink traffic requirement may be determined by the size of the neural network parameters, the number of devices participating in the learning, and the number of iterations of the learning. For example, for the VGG16 algorithm, the size of the neural network parameters is 138 million, and if each parameter value is implemented as 32 bits, each device needs to transmit approximately 552 megabytes of data over the uplink. Furthermore, assuming that the number of devices participating in the federated learning is 100 and the number of iterations of the learning is 100, the total size of the aggregated uplink traffic is 5.52 terabytes. Therefore, a method to reduce the above uplink traffic is required.

To solve this problem, recent research has been conducted on Over-the-Air Computation (AirComp) based federated learning.

Figure 24:
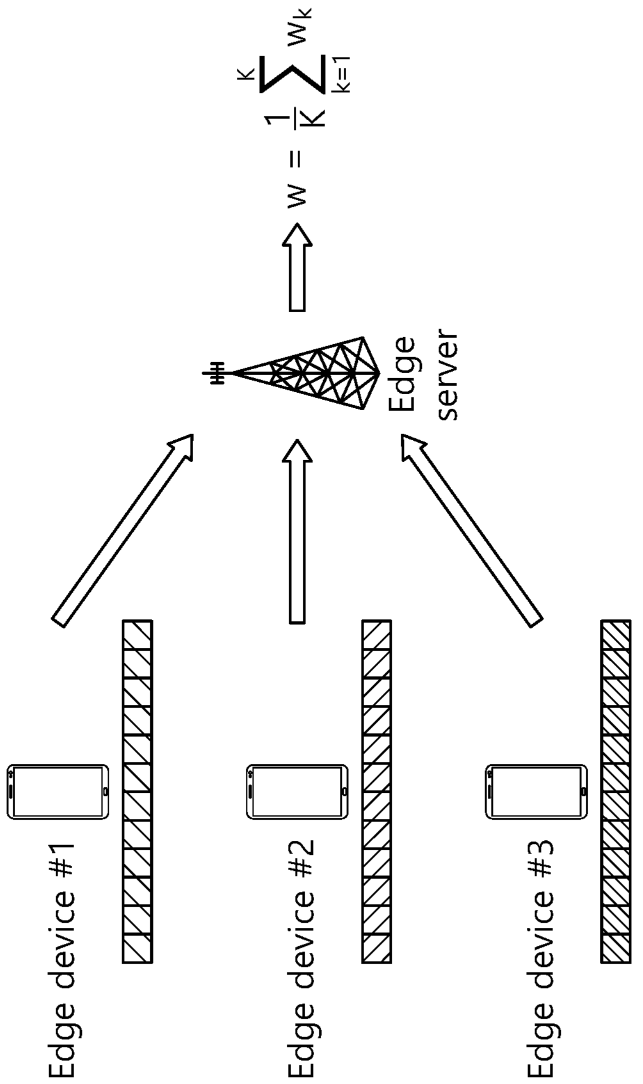
FIG. 24 illustrates an example of an AirComp-based federated learning operation process.

FIG. 24 illustrates an example of an AirComp-based federated learning operation process.

AirComp is a method in which all devices utilize the same resources to transmit local parameters, as shown in FIG. 24, and the signal received by the server can naturally obtain the sum of local neural network parameters due to the superposition characteristics of analog waveforms. Therefore, AirComp as shown in FIG. 24 may also be called analog AirComp. Since AirComp-based federated learning transmits local neural network parameters over the same resources, the required transmission resources do not increase as the number of devices participating in learning increases.

However, due to the characteristics of analog communication, there is no quantization loss of the source, but it may not be easy to obtain reliability through channel coding and detection, which are the advantages of conventional digital communication. Therefore, a method that can secure both resource efficiency and information reliability through superposition characteristics is required.

Accordingly, the following describes a method for transmitting and receiving digital air computation (AirComp).

Specifically, the present disclosure proposes a transmission and reception method in which each transmitter transmits through digital modulation using a digital communication technique, and the receiver directly detects the value to be computed, such as the sum or average of the data through the signals superimposed by the channel, without detecting the individual data of each transmitter.

Figure 25:
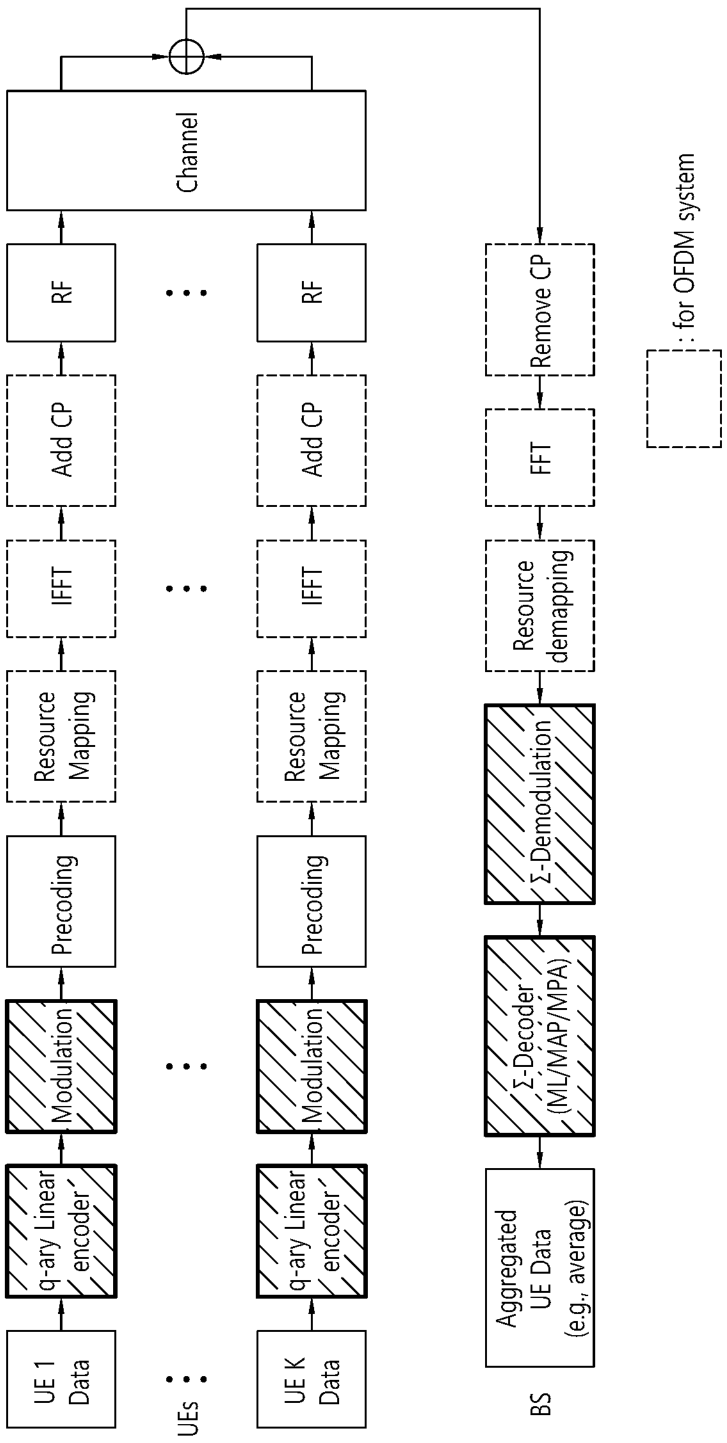
FIG. 25 is a block diagram of an example of a transmitting end of each of K UEs and a receiving end of a base station.

FIG. 25 is a block diagram of an example of a transmitting end of each of K UEs and a receiving end of a base station.

Referring to FIG. 25, the transmitting end of the UE may include a q-ary linear code block, a modulation block, a precoding block, and an RF block, and the receiving end of the base station may include a Σ-demodulation block and a Σ-decoder block. Here, the Σ-demodulation block may be a block that performs demodulation of the sum of the signals transmitted from the K UEs. Further, the Σ-decoder block may be a block that performs decoding of the sum of the signals transmitted from the K UEs.

Referring to FIG. 25, each of the K UEs may transmit its data over a channel, and the data passing through the channel may be combined with Additive White Gaussian Noise (AWGN) and transmitted to the base station. Meanwhile, the dotted blocks in FIG. 25, i.e., the resource mapping block, Inverse Fast Fourier Transformation (IFFT) block, and CP insertion block of the UE, and the CP removal block, Fast Fourier Transformation (FFT) block, and resource demapping block of the base station, are blocks that may be included when OFDM is used and may be omitted.

Figure 26:
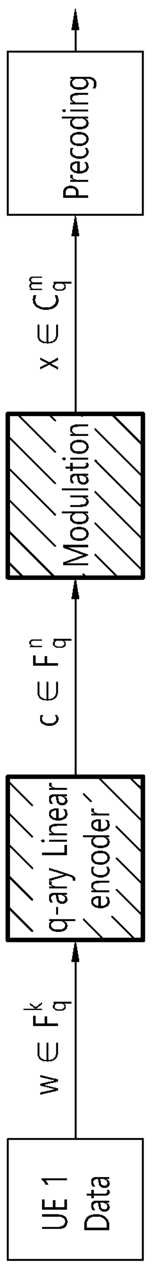
FIG. 26 illustrates a block diagram of a transmitting end.

FIG. 26 illustrates a block diagram of a transmitting end.

Referring to FIG. 26, data at the transmitting end may pass through a q-ary linear encoder block, a modulation block, and a precoding block, in that order. In general, q may be any prime number or power of a prime number greater than or equal to 2.

Specifically, a q-ary block of data with length k is input to the q-ary linear encoder block. The q-linear encoder block then encodes the input of length k into a q-linear codeword output of length n. Here, k/n is the code rate, and the code rate may be configured by the base station, such as DCI.

Meanwhile, a modulation block may be defined as a block that adds a linear mapping and an offset to the input. The linear mapping rule and the offset value may be pre-defined. The linear mapping may be performed based on the following equation.

$$[c_1 \ c_2]\begin{bmatrix} g_1 \\ g_2 \end{bmatrix} + [b_1 \ b_2] = [x_R \ x_I] \quad \text{[Equation 1]}$$

The above equation represents the mapping of two q-ary values $c_1$ and $c_2$ to a complex domain. Here, $g_1$ and $g_2$ denote basis vectors that are 2 by 1 real-valued row vectors. The two unit vectors span two dimensions. Also, $b_1$ and $b_2$ are real-valued offset values. The above equation finally produces the mapped symbol $x_R+j*x_1$.

Furthermore, in the precoding block, the channel is pre-equalized to generate the transmitted signal.

FIG. 27 illustrates an example of input data in a signal generation method of a transmitting device.

For example, data $w_1$ of length k may be defined as shown in FIG. 27. Here, the example in FIG. 27 assumes q=7.

Figure 28:
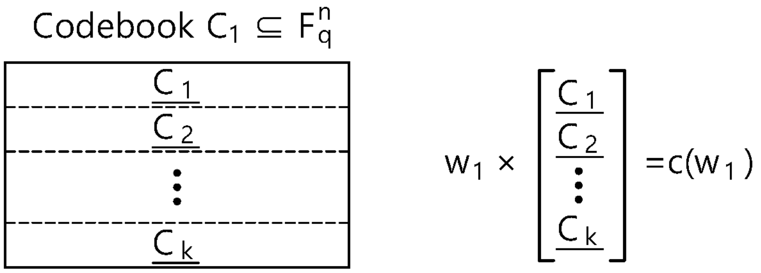
FIG. 28 illustrates an example of data passing through a q-ary linear encoder block.

FIG. 28 illustrates an example of data passing through a q-ary linear encoder block.

Referring to FIG. 28, the q-ary linear encoder block receiving $w_1$ as input outputs a codeword $c(w_1)$ of length n via codebook $c_1$. Here, $\underline{c_1}, \underline{c_2}, \ldots, \underline{c_k}$ are elements of the codebook $c_1$. Also, here, n may be $q^k$.

Figure 29:
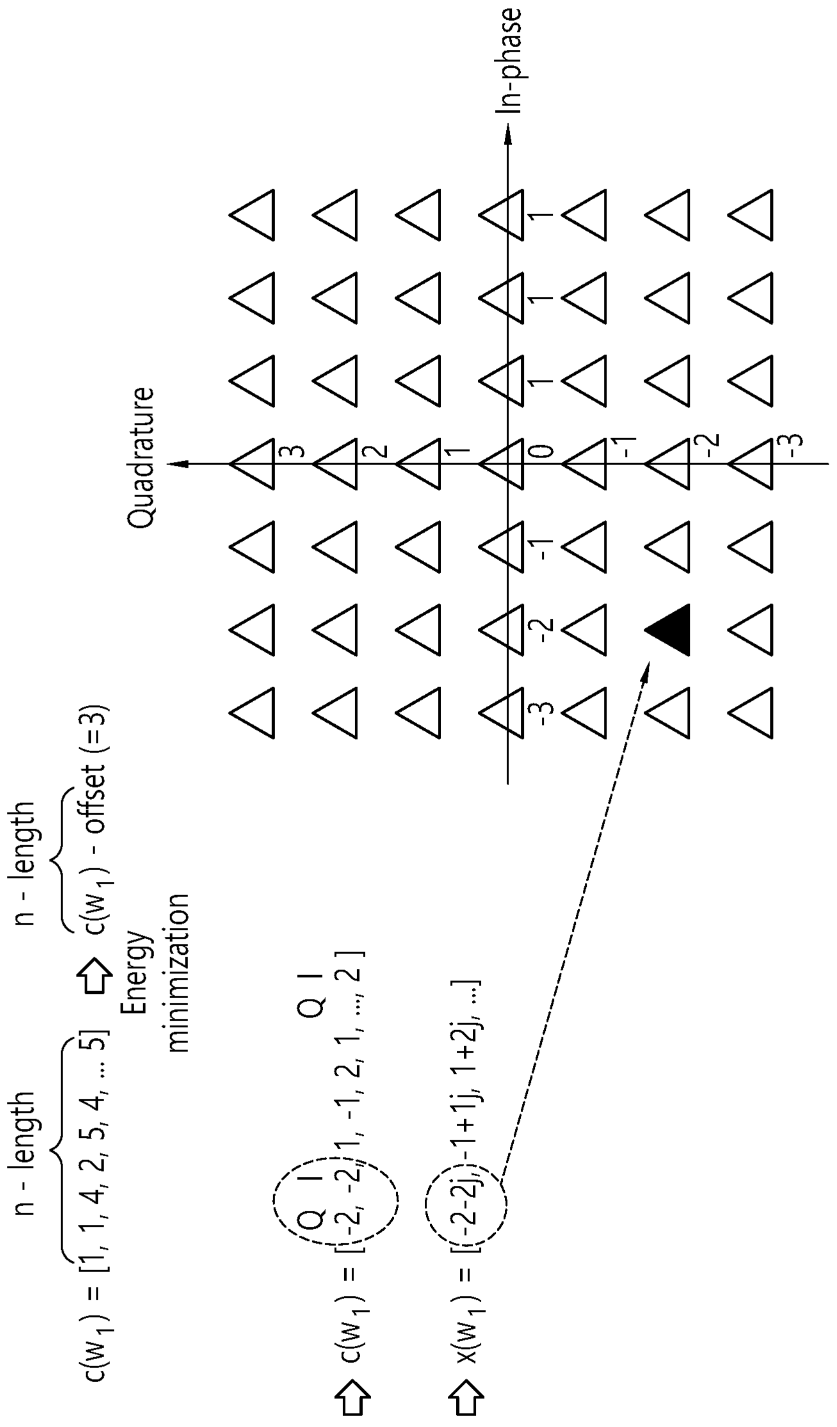
FIG. 29 illustrates an example of data passing through a modulation block.

FIG. 29 illustrates an example of data passing through a modulation block.

Referring to FIG. 29, the modulation block maps offsets to symbols in the codeword $c(w_1)$. The example in FIG. 29 illustrates a case where an offset is 3. Here, the offset may be a pre-determined value for power/energy minimization.

Referring to FIG. 29, the transmitting end generates the transmission signal by mapping values for which the offset is applied for the codeword $c(w_1)$ to an in-phase/quadrature signal, i.e., an I/Q signal, respectively.

Referring to FIG. 29, each element of $c(w_1)=[-2, -2, 1, -1, \ldots]$ is listed in the order Q, I, and the I/Q mapping is equivalent to $-2-2j$, $-1+j$, . . . .

Although not shown in FIG. 29, the generated transmission signal may be passed through a precoding block where pre-equalization may be performed for the channel. That is, the signal may be transmitted by considering the effects of the channel that may be added to the transmission signal in advance at the transmitting end. For example, if the channel is complex h, the pre-equalization is performed by multiplying the transmission signal by 1/h.

Figure 30:
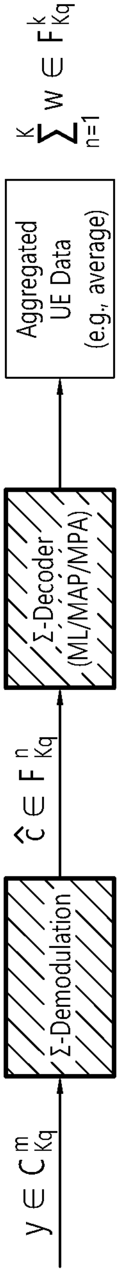
FIG. 30 illustrates a block diagram of a receiving end.

FIG. 30 illustrates a block diagram of a receiving end.

In FIG. 30, it is assumed that the receiving end receives signals transmitted by K UEs. In other words, in FIG. 30, the receiving end performs demodulation and decoding based on the sum of the signals transmitted by the K UEs.

Referring to FIG. 30, the receiving end performs Σ-demodulation on the received signals superimposed on the channel. Here, the Σ-demodulation is characterized by constructing a hypothesis for demodulation based on K. Based on the estimation, soft information or hard information about the received signal may be obtained.

Further, the demodulated information is subjected to Σ-decoding by a I-decoder.

Here, the Σ-decoder may mean performing decoding based on a combination of codewords based on K.

Figure 32:
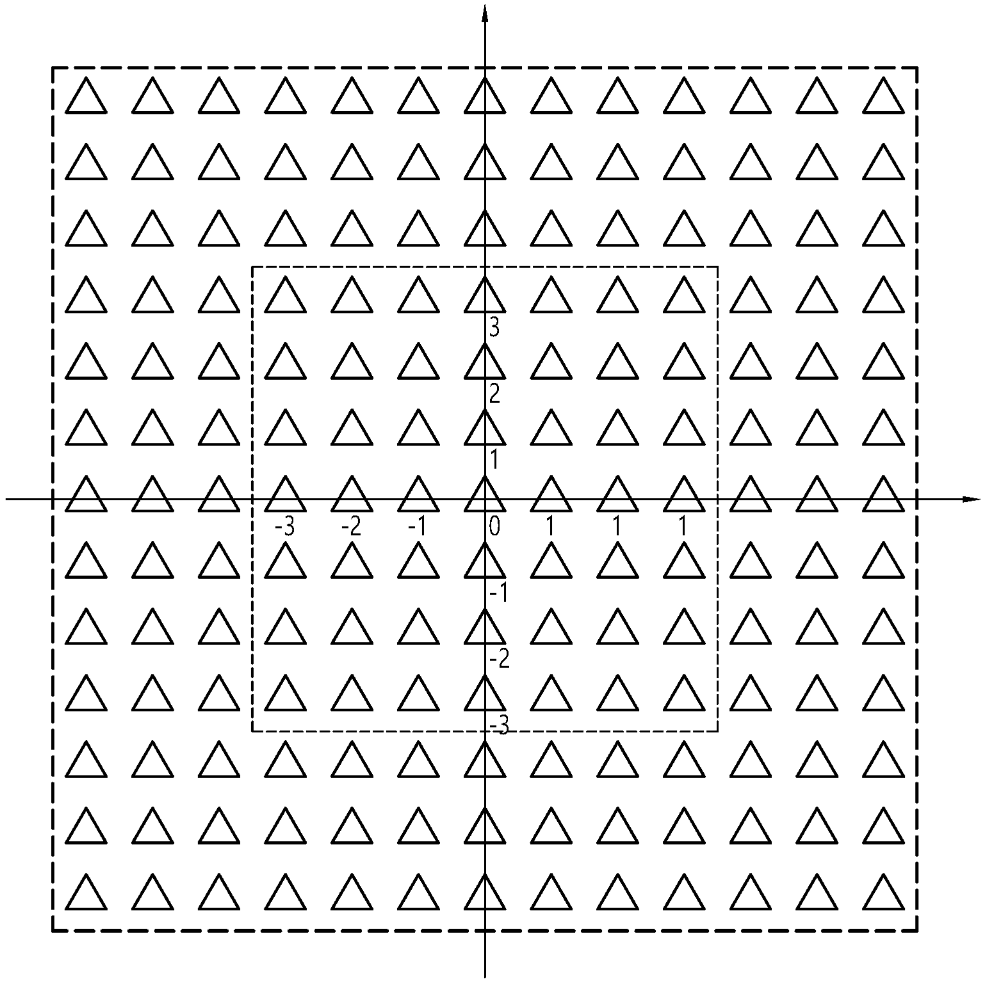
FIG. 32 illustrates an example of Σ-demodulation.

FIG. 31 illustrates an example of data acquisition by a receiving device. FIG. 32 illustrates an example of Σ-demodulation.

The example of FIG. 31 assumes that the receiving device has received signals from two transmitting devices. The example of FIG. 31 also assumes that all channel effects have been equalized by precoding at the transmitting end. Also, as in FIG. 27, q=7 is assumed.

Referring to FIG. 31, the received signal y may be the sum of the signals $x_1$ and $x_2$ transmitted from the two transmitting devices and noise. The received signal may be divided into an in-phase signal $y_1$ and a quadrature-phase signal $y_Q$, which may be represented as z in FIG. 31.

The receiving device then performs Σ-demodulation. After reversely compensating for the offset value applied at the transmitting end through Σ-demodulation, a soft value or a hard value for the information may be obtained through a hypothesis of the symbol based on K (K=2 in the example of FIG. 31).

Taking the received signal of FIG. 31 as an example, when the offset value is 3, as in FIG. 27, a soft value or a hard value may be obtained based on the hypothesis of an overlapping 13 by 13 (2*7−1, since q=7 in FIG. 31) based on the value of Z+3+3, i.e., Z+6, since it is assumed that there are two transmitting devices, which may be illustrated as the outer box of FIG. 32.

Figure 33:
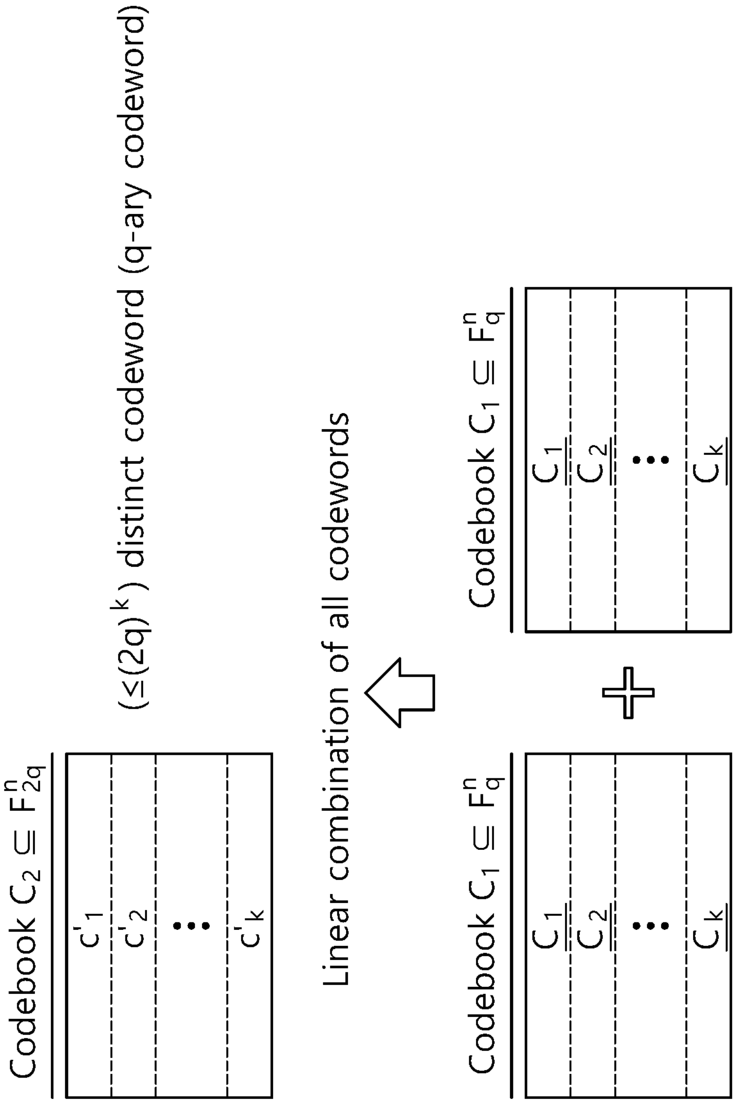
FIG. 33 illustrates an example of Σ-decoding.

FIG. 33 illustrates an example of Σ-decoding.

Referring to FIG. 33, the Σ-decoder may construct candidate codewords through the combination of two codewords based on the codebook $c_1$ of the encoder promised with the transmitting end. That is, the receiving end may perform decoding using the codebook which combines codebooks of each of the two transmitting ends. This allows the aggregated data to be finally detected using Maximum Likelihood (ML), Maximum A Posteriori (MAP), or sphere decoding.

The transmission and reception methods of the data according to FIGS. 25 to 33 may be pre-configured/pre-defined between the transmitting end and the receiving end, or between the UE and the base station, e.g., the base station may inform the UEs of the transmission and reception methods through downlink signaling, and the UEs may transmit the data based on the transmission and reception methods.

Figure 34:
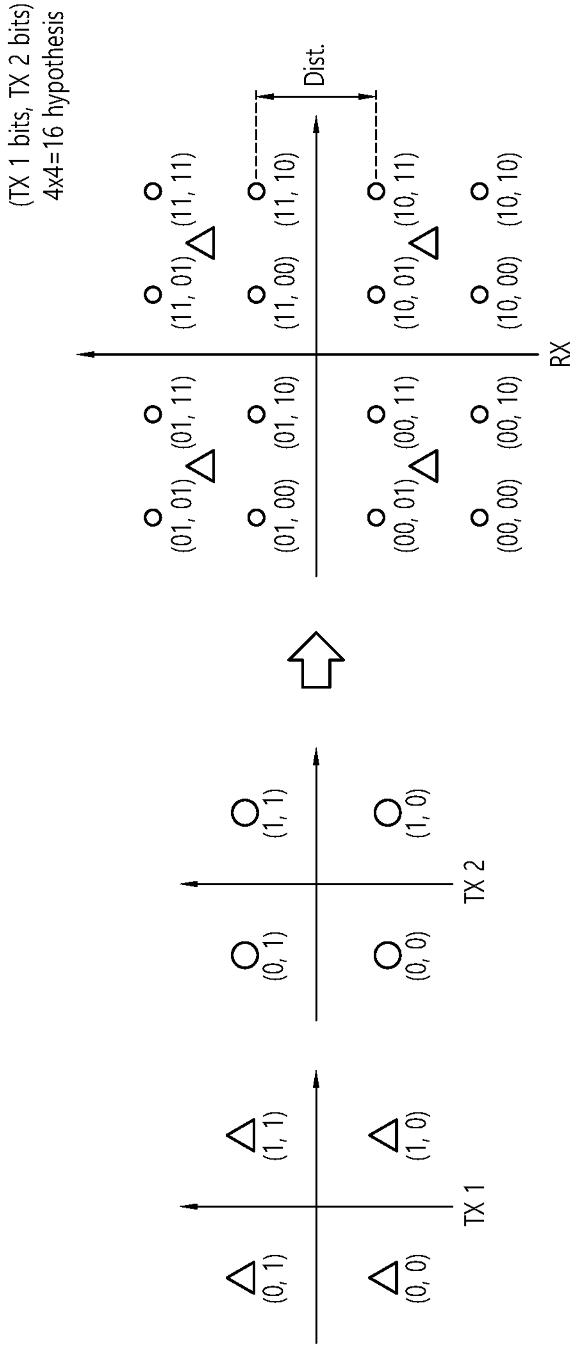
FIGS. 34 to 36 illustrate differences between a conventional uplink transmission method of a plurality of Ues and a method of transmitting and receiving data according to the present disclosure.
Figure 35:
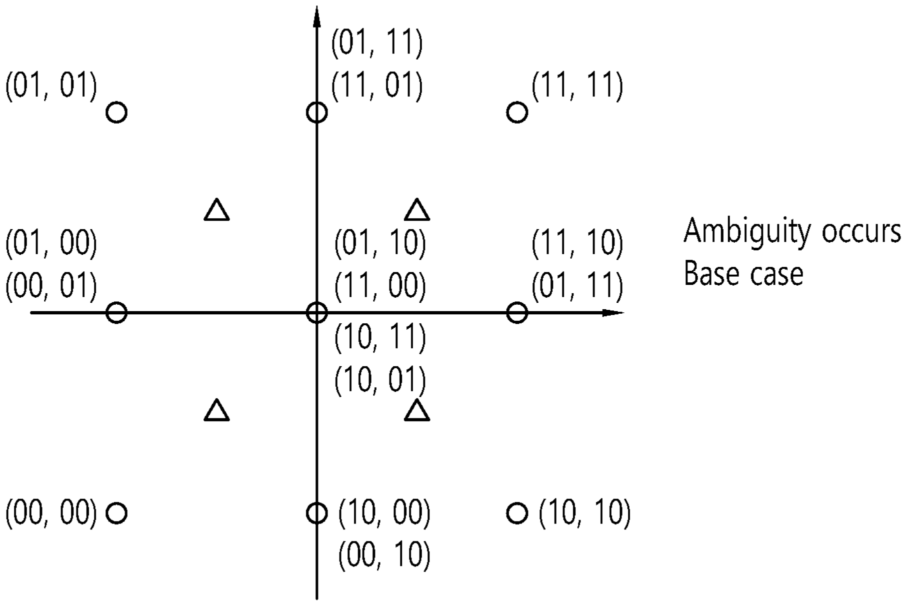
Figure 36:
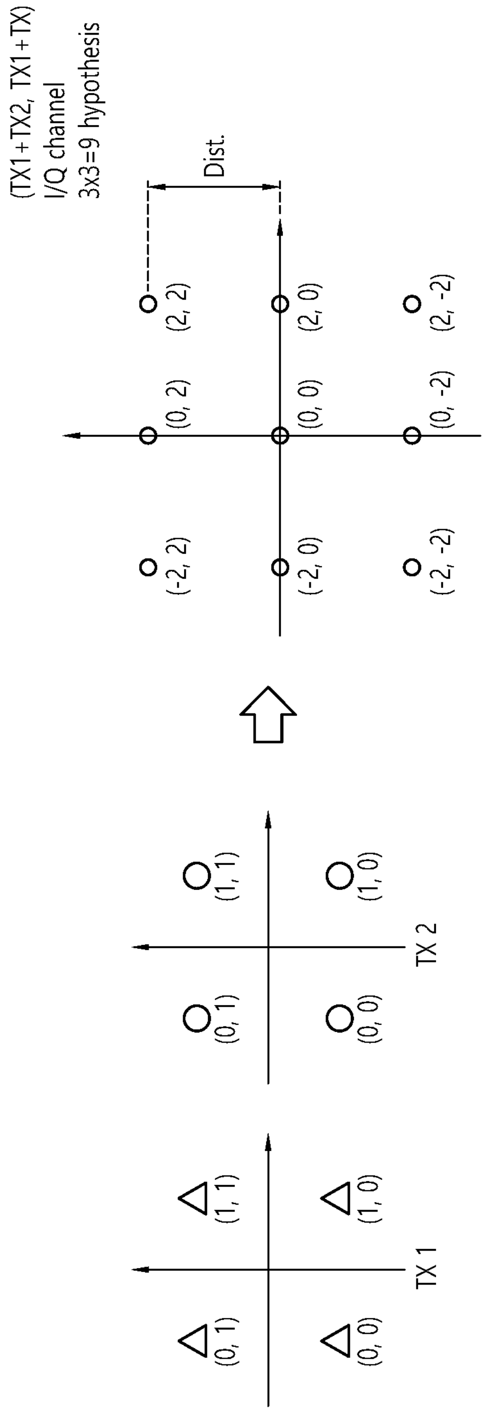

FIGS. 34 to 36 illustrate differences between a conventional uplink transmission method of a plurality of UEs and a method of transmitting and receiving data according to the present disclosure.

An example of FIGS. 34 to 36 assumes that two UEs transmit uplink signals to a base station using 4-Quadrature Amplitude Modulation (QAM). In this case, the base station wants to detect a signal from the first UE and a signal from the second UE.

Referring to FIG. 34, which shows a conventional transmission technique, the signals at the receiving end (RX) can be transmitted with a 4 by 4 hypothesis so that the distance between each superimposed signal is maximized. In other words, according to the conventional transmission technique, the codewords of each of the two UEs may be independent. Here, it is obvious that if the signals overlap as shown in FIG. ambiguity in detection will occur and performance degradation will occur.

On the other hand, from the perspective of joint computation and communication, the objective may be to obtain a function of the combined data without trying to detect the data of each UE. Therefore, unlike conventional methods, when obtaining the sum of the data of the first UE and the second UE as shown in FIG. 36, it may be necessary to maximize the distance of the overlapping symbols as much as possible. That is, unlike FIGS. 34 and 35, according to the method proposed in the present disclosure, the combined data is detected by intentionally maximizing the distance between the overlapping symbols.

It is self-evident that the method is not limited to federated learning, but may be applied to any system that simultaneously performs computation and communication via superposition over a wireless channel. Furthermore, the method is applicable not only to uplinks, but also to situations where multiple communication devices, such as sidelinks, simultaneously transmit data.

Figure 37:
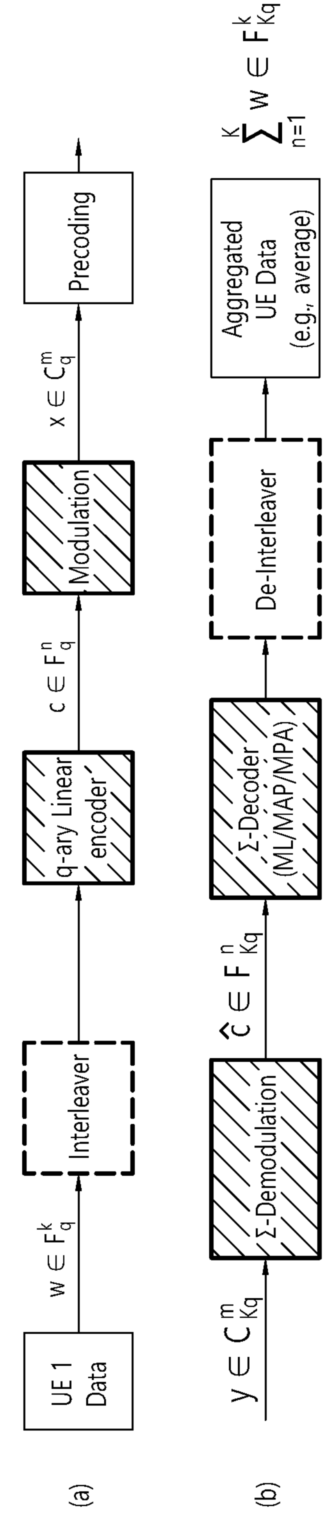
FIG. 37(*a*) and FIG. 37(*b*) are block diagrams of another example of a transmitting end and a receiving end proposed in the present disclosure.

FIG. 37 is a block diagram of another example of a transmitting end and a receiving end proposed in the present disclosure. Specifically, (a) of FIG. 37 illustrates another example of a transmitting end, and (b) of FIG. 37 illustrates another example of a receiving end.

Referring to (a) of FIG. 37, compared to FIG. 26, the data passes through an interleaver block and then through a q-ary linear encoder block. Also, referring to (b) of FIG. 37, compared to FIG. 30, the data passes through a de-interleaver block after Σ-decoding. This can correct errors caused by burst errors in the data and increase the detection efficiency and channel decoding performance.

On the other hand, the positions of the interleaver block and the de-interleaver block in (a), (b) of FIG. 37 are only examples, and it is self-evident that the opposite operation can be performed by positioning the de-interleaver block at a corresponding position at the receiving end, even if it is positioned after the q-ary linear encoding block or after the modulation block.

While FIG. 37 illustrates an example based on an interleaver block, it is self-evident that blocks other than interleaver blocks may be included at the transmitting end and the receiving end.

Figure 38:
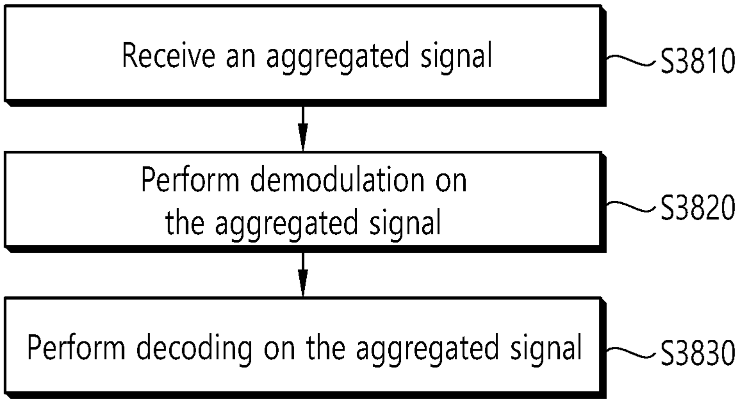
FIG. 38 is a flow diagram of an example of a signal reception method of a base station performing federated machine learning according to some implementations of the present disclosure.

FIG. 38 is a flow diagram of an example of a signal reception method of a base station performing federated machine learning according to some implementations of the present disclosure.

Referring to FIG. 38, the base station receives an aggregated signal (S3810). Here, the aggregated signal may be a superposition of signals transmitted from each of the plurality of UEs over a wireless channel. Further, each of the signals may comprise information about neural network parameters related to the federated machine learning performed by each of the plurality of UEs.

Subsequently, the base station performs demodulation on the aggregated signals (S3820). Here, the demodulation may be performed on a superimposed signal as described above. That is, in order to detect the superimposed data without detecting the data transmitted by each UE, the demodulation may be performed based on a constellation defined for the aggregated signal.

The base station performs decoding on the demodulated aggregated signal (S3830). Here, the decoding may be performed based on a q-ary linear decoder. Here, the decoding may be performed based on a codebook which combines the codebooks of each of the plurality of UEs. Further, the codebooks of each of the plurality of UEs may be predefined or pre-configured.

Figure 39:
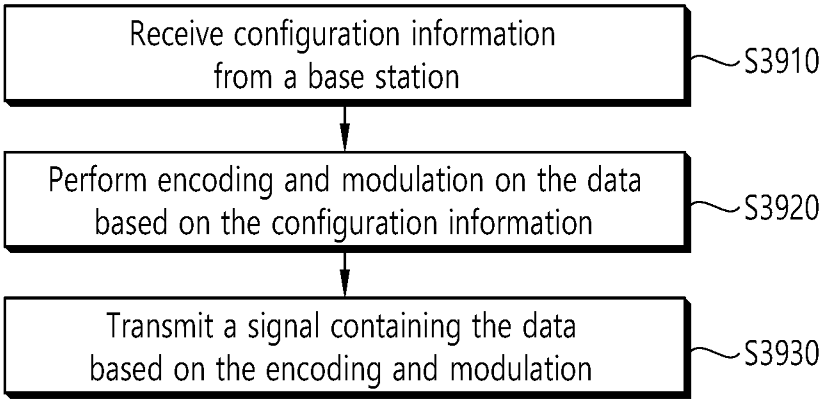
FIG. 39 is a flow diagram of an example of a signal transmission method of a UE performing federated machine learning according to some implementations of the present disclosure.

FIG. 39 is a flow diagram of an example of a signal transmission method of a UE performing federated machine learning according to some implementations of the present disclosure.

Referring to FIG. 39, a UE receives configuration information from a base station (S3910). Here, the configuration information may inform a modulation method and an encoding method applied to the UE. Here, the modulation method and the encoding method may be the same for a plurality of UEs including the UE.

Subsequently, the UE performs encoding and modulation on the data based on the configuration information (S3920). Here, for example, the encoding may be a Q-ary linear encoding. Also, here, a codebook used for the encoding may be pre-configured/pre-defined or identical for a plurality of UEs including the UE.

Subsequently, the UE transmits a signal containing the data based on the encoding and modulation (S3930).

Meanwhile, since it is self-evident that the methods proposed in the present disclosure may be applied to the methods of FIGS. 38 and 39, redundant explanations will be omitted.

The claims set forth herein can be combined in a variety of ways. For example, the technical features of the method claims of the present disclosure may be combined to be implemented as a device, and the technical features of the device claims of the present disclosure may be combined to be implemented as a method. In addition, the technical features of the method claims of the present disclosure and the technical features of the device claims may be combined to be implemented as a device, and the technical features of the method claims of the present disclosure and the technical features of the device claims may be combined to be implemented as a method.

In addition to a UE/edge device, the methods proposed herein may also be performed by a device configured to control a UE, including at least one computer readable medium comprising instructions based on being executed by at least one processor, and at least one processor, and at least one memory operably connectable to the at least one processor and storing instructions, wherein the at least one processor executes the instructions to perform the methods proposed herein. Furthermore, it is self-evident that according to the methods proposed herein, actions by the base station/edge server corresponding to actions performed by the terminal/edge device may be considered.

What is claimed is:

1. A method comprising:

receiving a random access preamble from a plurality of terminals;

transmitting a random access response to the plurality of terminals in response to the random access preamble;

receiving an aggregated signal;

performing a demodulation on the aggregated signal; and performing a decoding of the aggregated signal on which the demodulation is performed, wherein the decoding is performed based on a codebook which combines codebooks of each of the plurality of terminals, wherein the aggregated signal is a signal in which signals transmitted from each of the plurality of terminals are superimposed over a wireless channel, wherein each of the signals comprises information about a neural network parameter related to a federated machine learning performed by each of the plurality of terminals, wherein the demodulation is performed based on a constellation defined for the aggregated signal, not for the signals transmitted from each of the plurality of terminals, and wherein a distance between overlapping symbols for the signals transmitted from each of the plurality of terminals is maximized in the constellation defined for the aggregated signal.

2. The method of claim 1, wherein the decoding is performed based on a q-ary linear decoder.

3. The method of claim 1, wherein the method further comprises obtaining superimposed data contained in the superimposed signals, and wherein the superimposed data is a sum of the neural network parameter of each of the plurality of terminals.

4. The method of claim 1, wherein each of the signals transmitted from each of the plurality of terminals is transmitted over same frequency resource as each other.

5. The method of claim 1, wherein the method is performed by a base station, and wherein the base station is an edge server, and each of the plurality of terminals is an edge device.

6. A base station comprising:

one or more memories storing instructions;

one or more processors operably connected the one or more memories, wherein the one or more processors, by executing the instructions, cause the base station to perform operations comprising:

receiving a random access preamble from a plurality of terminals;

transmitting a random access response to the plurality of terminals in response to the random access preamble;

receiving an aggregated signal;

performing a demodulation on the aggregated signal; and performing a decoding of the aggregated signal on which the demodulation is performed, wherein the decoding is performed based on a codebook which combines codebooks of each of the plurality of terminals, wherein the aggregated signal is a signal in which signals transmitted from each of the plurality of terminals are superimposed over a wireless channel, wherein each of the signals comprises information about a neural network parameter related to a federated machine learning performed by each of the plurality of terminals, wherein the demodulation is performed based on a constellation defined for the aggregated signal, not for the signals transmitted from each of the plurality of terminals, and wherein a distance between overlapping symbols for the signals transmitted from each of the plurality of terminals is maximized in the constellation defined for the aggregated signal.

* * * * *